Figure 1:
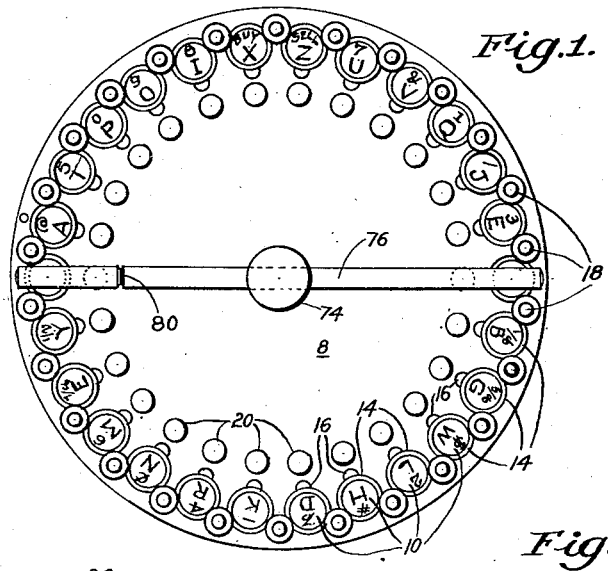

June 7, 1932.   E. H. HEBERN   1,861,857
CRYPTOGRAPHIC MACHINE
Filed May 17, 1927    12 Sheets-Sheet 1

INVENTOR
Edward H. Hebern
BY
M. C. Frank
ATTORNEY

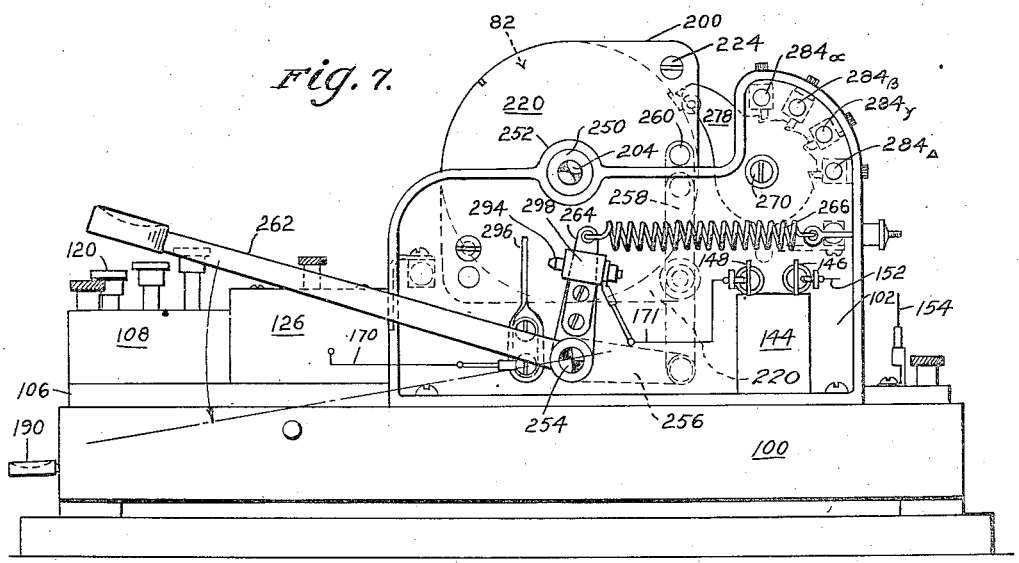
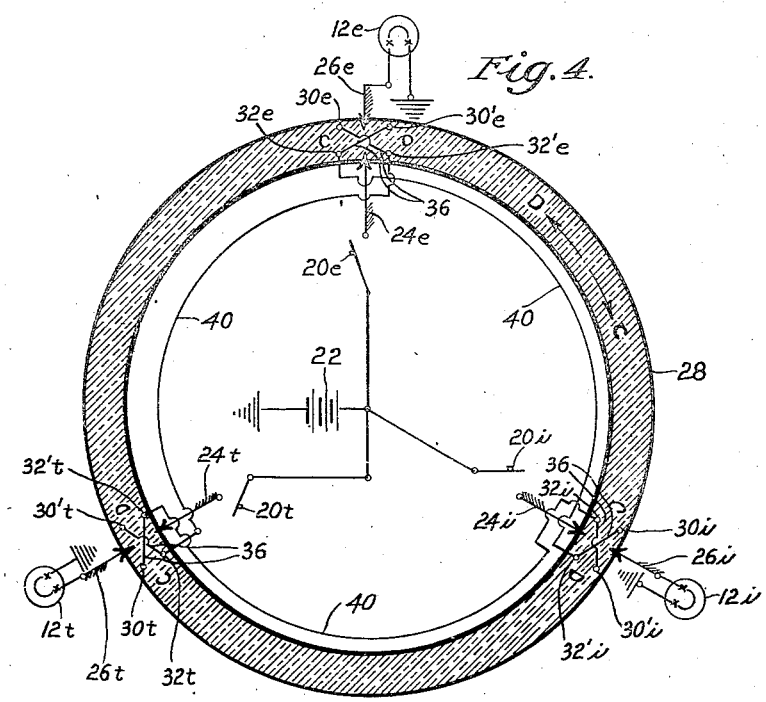

June 7, 1932.  E. H. HEBERN  1,861,857
CRYPTOGRAPHIC MACHINE
Filed May 17, 1927  12 Sheets-Sheet 3
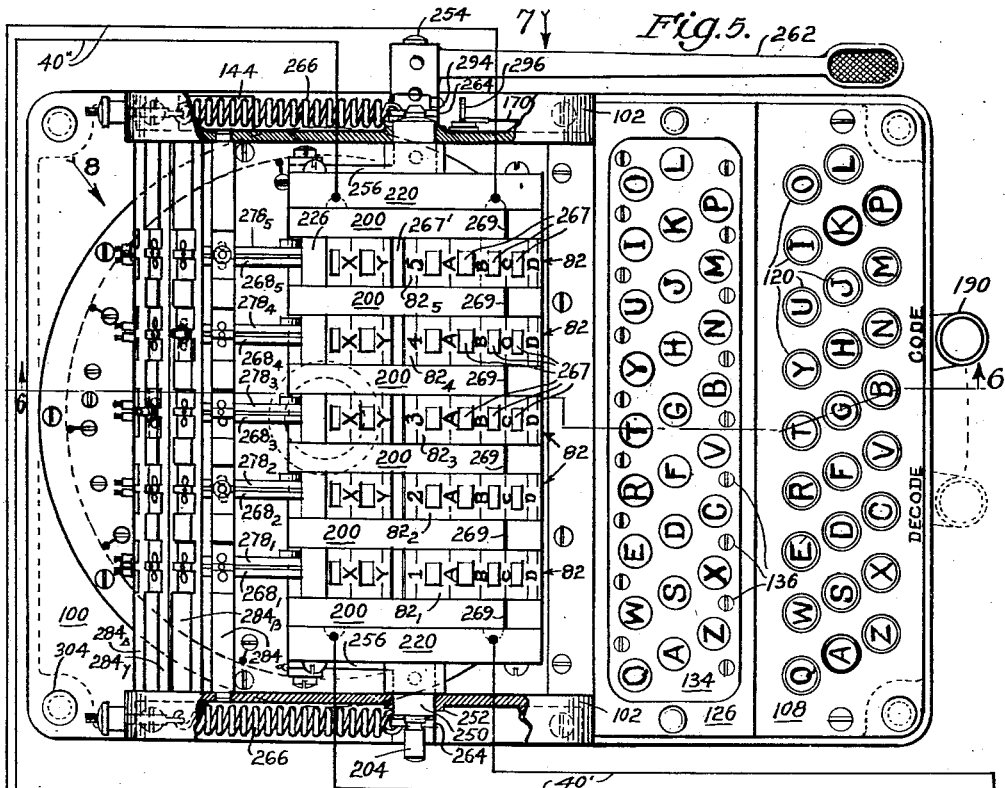

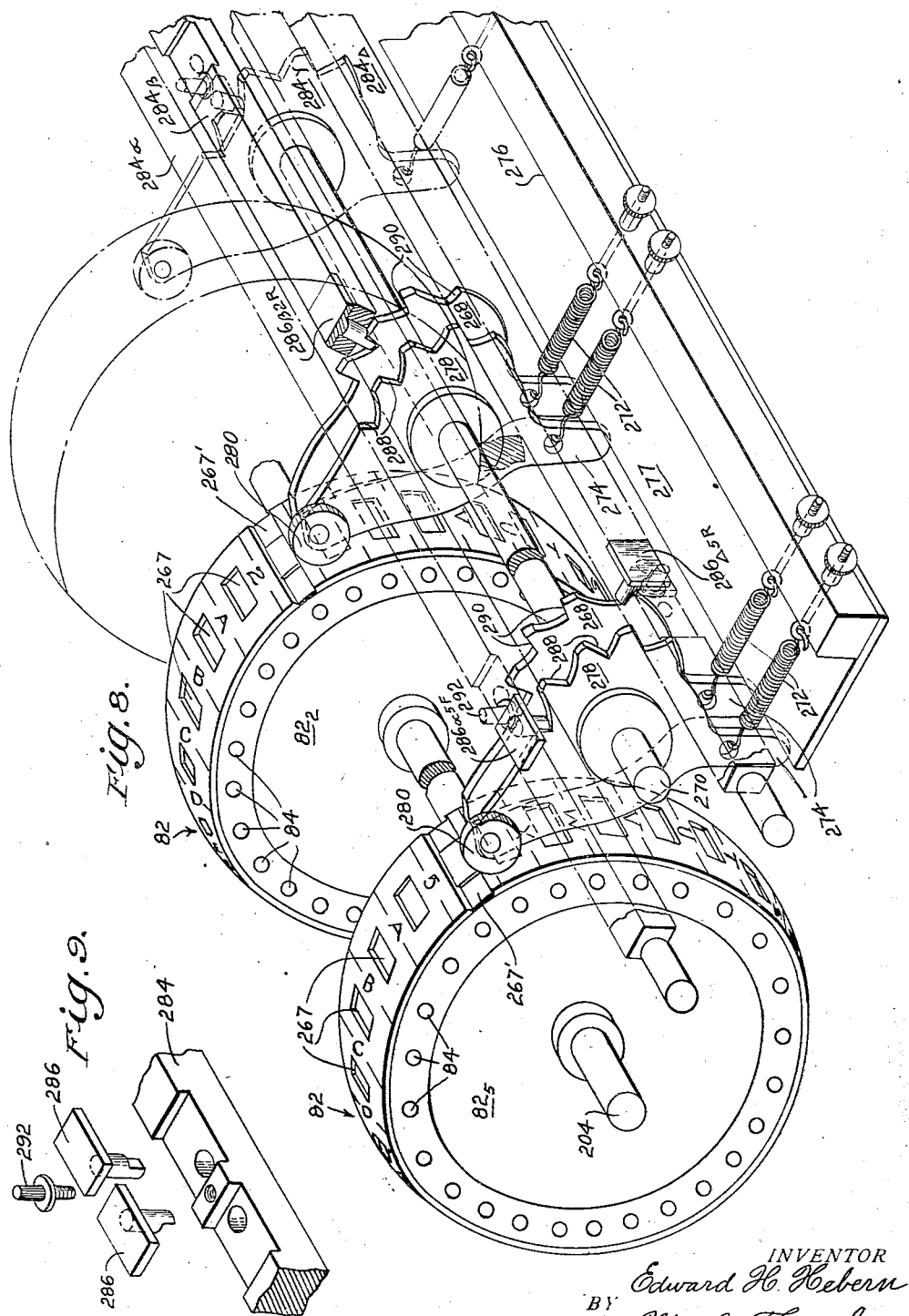

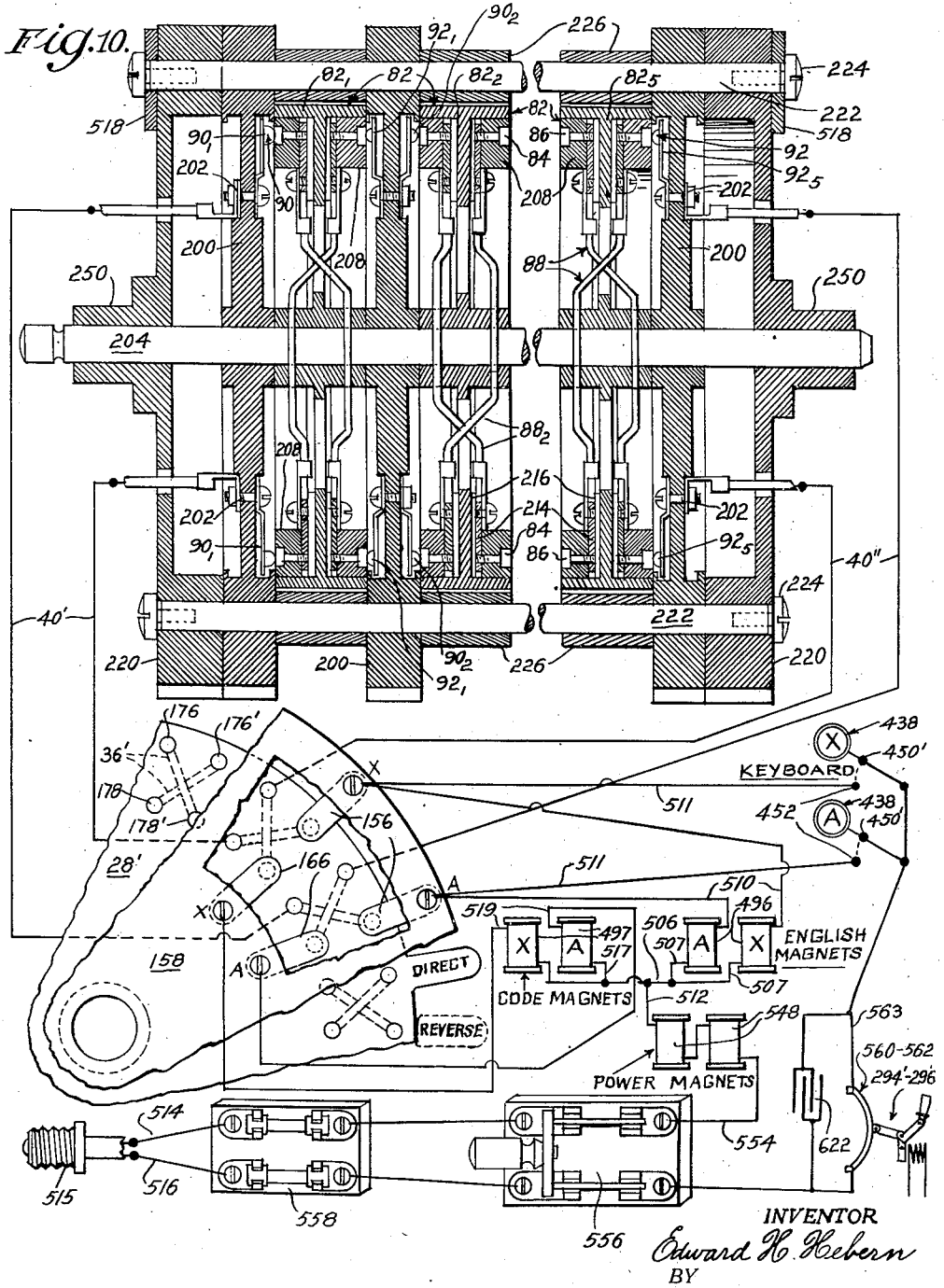

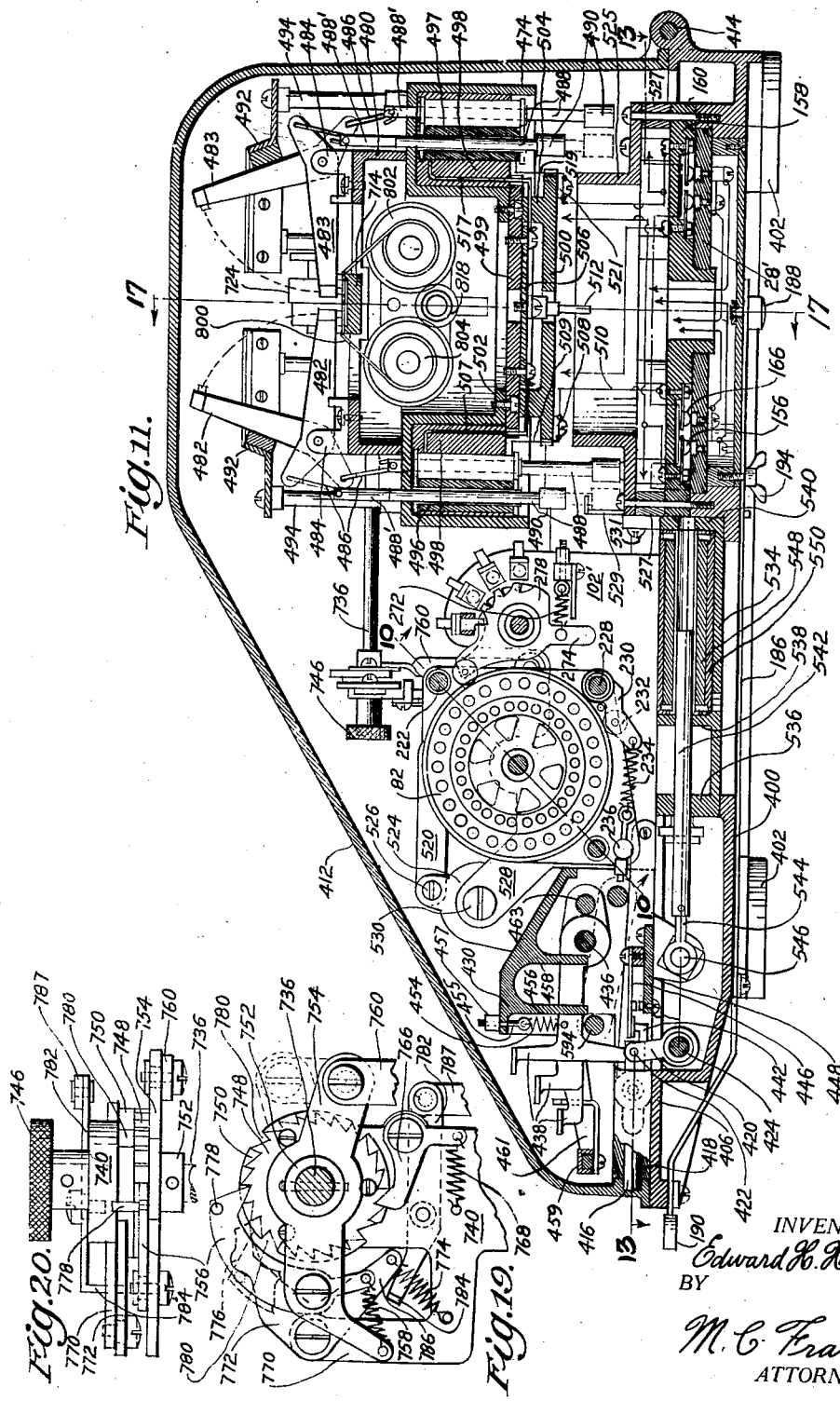

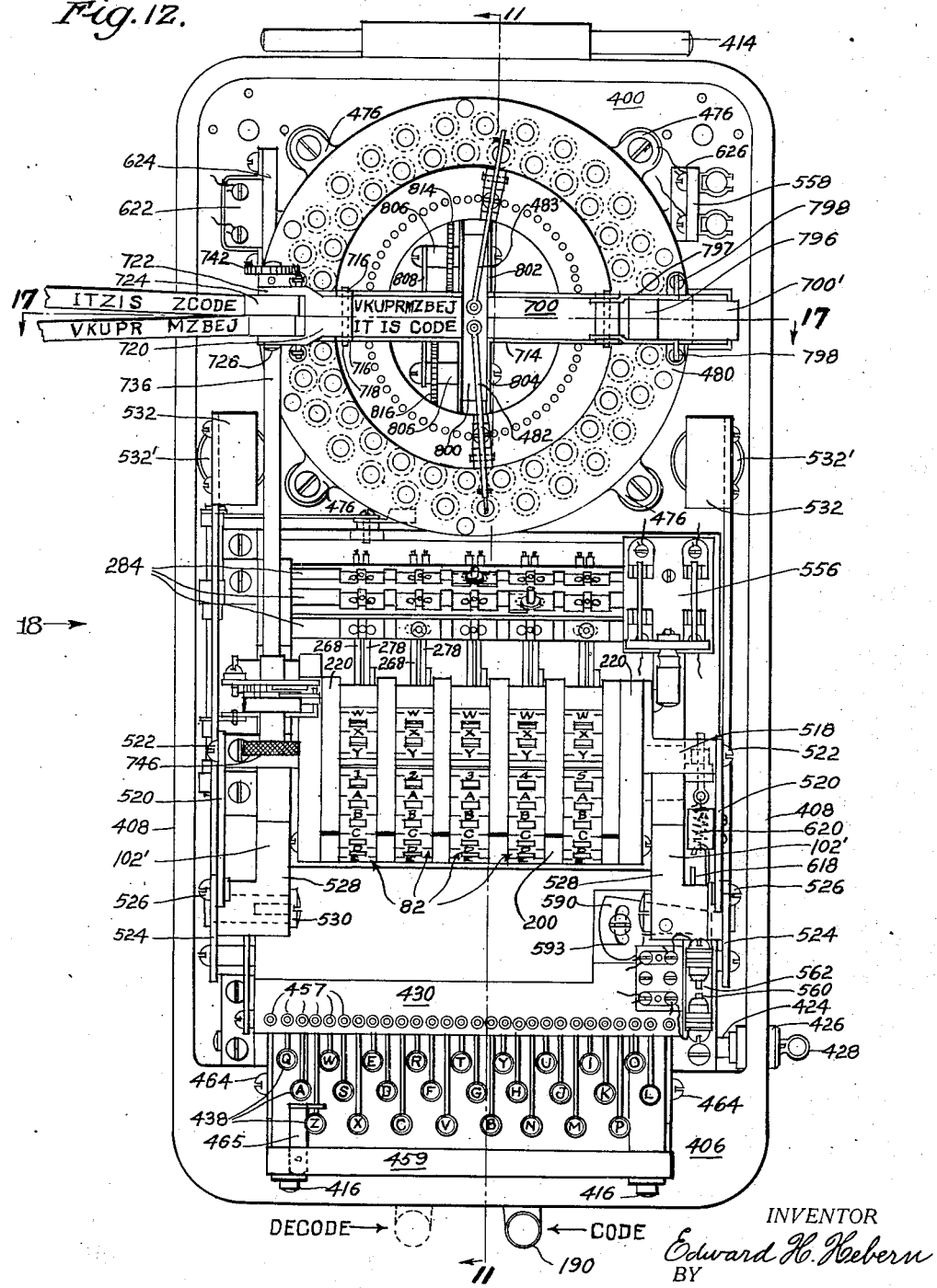

June 7, 1932.　　　E. H. HEBERN　　　1,861,857
CRYPTOGRAPHIC MACHINE
Filed May 17, 1927　　12 Sheets-Sheet 8

INVENTOR
Edward H. Hebern
BY
M. C. Frank
ATTORNEY

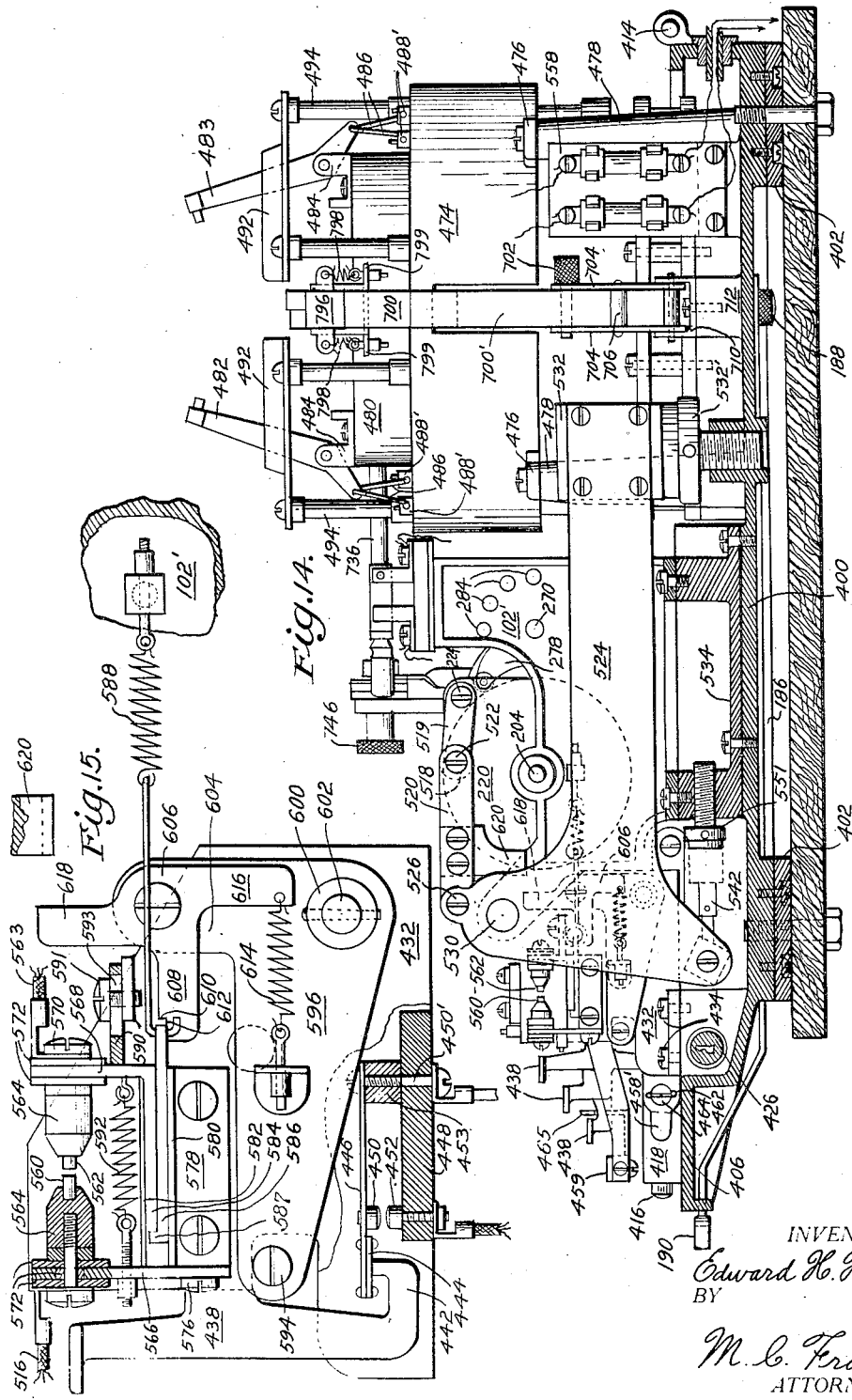

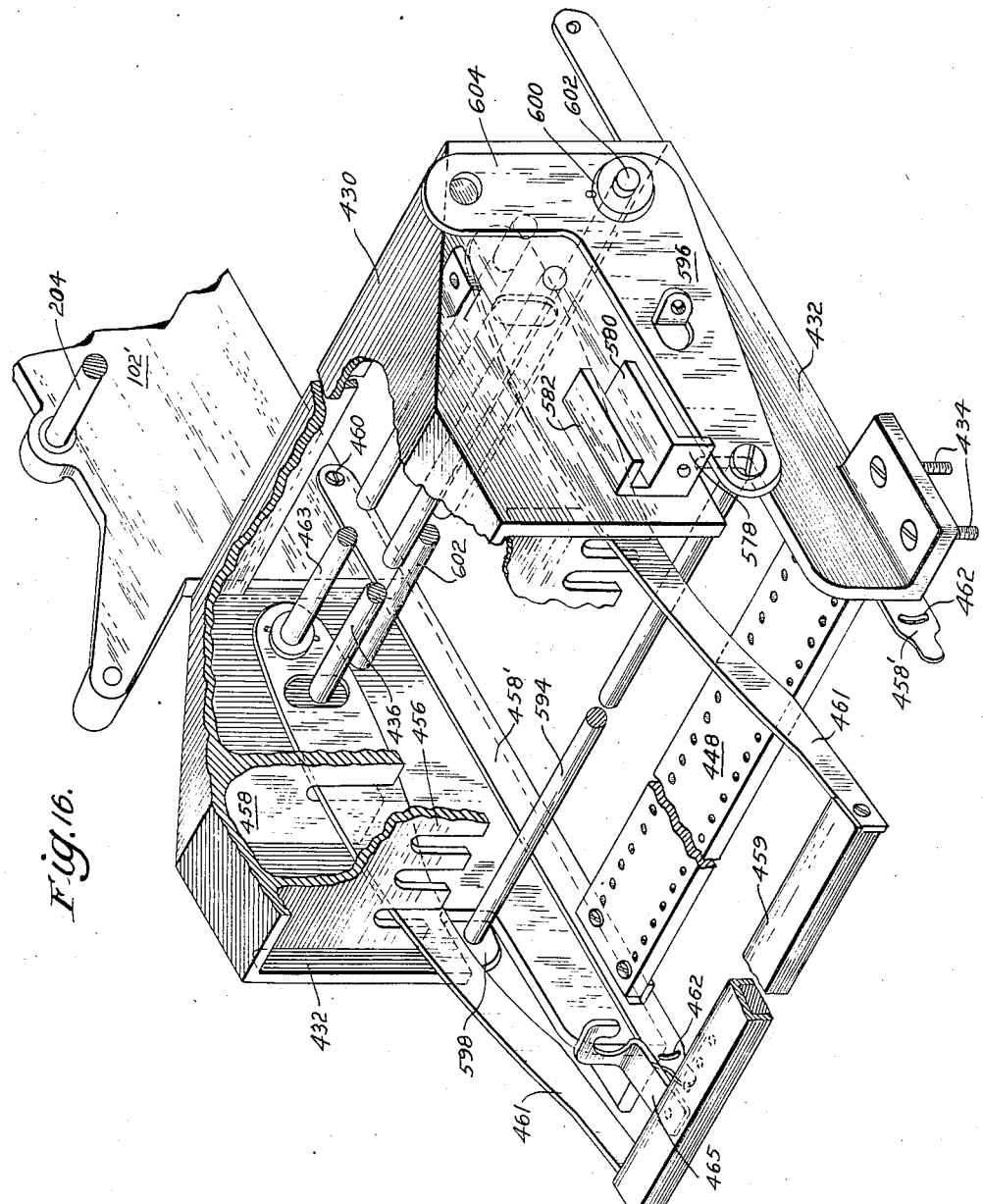

June 7, 1932.  E. H. HEBERN  1,861,857
CRYPTOGRAPHIC MACHINE
Filed May 17, 1927   12 Sheets-Sheet 11
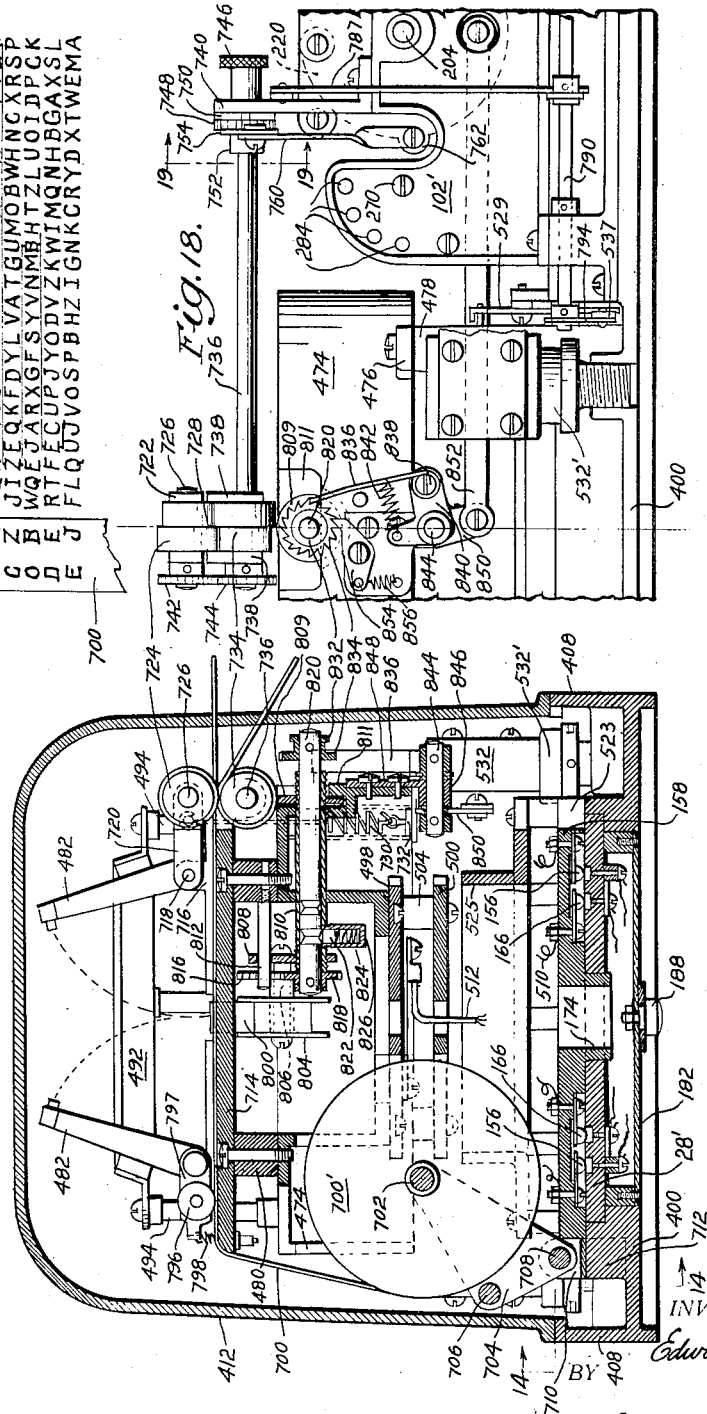
INVENTOR
Edward H. Hebern
BY
M. C. Frank
ATTORNEY

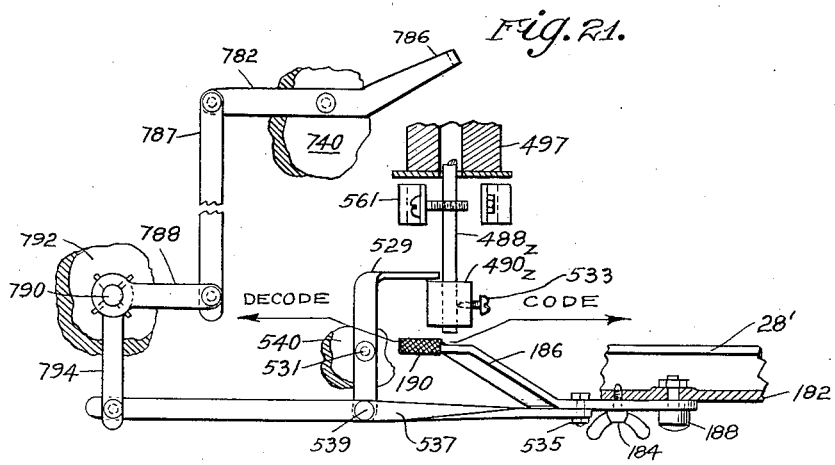

Patented June 7, 1932

1,861,857

UNITED STATES PATENT OFFICE

EDWARD H. HEBERN, OF OAKLAND, CALIFORNIA, ASSIGNOR TO INTERNATIONAL CODE MACHINE COMPANY, OF RENO, NEVADA, A CORPORATION OF NEVADA

CRYPTOGRAPHIC MACHINE

Application filed May 17, 1927. Serial No. 192,074.

This invention is an improvement of the invention set forth in my copending application Serial No. 675,898 Filed Nov. 20, 1923, which has matured into Patent No. 1,683,072, dated Sept. 4, 1928.

My invention relates to the art of secret writing; and provides a new system for transforming language messages into decodable secret code, an improved device for accomplishing the system, and a highly-refined electric coding machine.

The object of my coding system, device or machine is to guard the secrecy of code messages. To the layman, one crypt is as unintelligible as another, but to the relatively few cryptographic experts whose profession is the deciphering of secret codes, no secret of past systems, devices or machines has permanently resisted a determined and prolonged effort at discovery.

It is an object of my invention to provide a mechanism and a practical system for coding and decoding absolutely or practically undecipherable cryptograms.

It is an object of my invention to attain a high ratio of complexity of code to complexity of the mechanism and system for forming and decoding messages in said code. It is an object of my invention to introduce a new order of complexity of code into the cryptographic art.

It is an object of my invention determinedly to break up the vulnerable sequences, repetitions and recurrences heretofore discoverable in code messages by experts bent on deciphering said messages. It is an object of my invention to break up these sequences, repetitions, and recurrences according to a definite system, whereby the coding and decoding operations are simplified.

It is an object of my invention to combine a number of relatively simple code-forming plans to produce a maximum resultant complexity, (e. g. a complexity determined by an exponential function of said number of plans). It is an object of my invention to substantially exhaust the code-changing possibilities of the combination of plans. It is a further object of my invention to permit and provide a maximum freedom of choice in each of these plans, in their relation to one another, in the manner of their combination or composition, in the method of their use, or in any one of these choices alone or in combination. It is an object of my invention to permit the use of absolutely random relations and plans or sequences. It is an object of my invention to permit the code-forming plans to be arranged in any order. It is a further object of my invention to permit the plans to be transposed. It is an object of my invention to permit the use of less than all the possible plans or sequences. It is an object of my invention to permit bodily displacement of any plan or sequence to any starting position of use.

It is an object of my invention to provide one and the preferred generic device for accomplishing the system of my invention, and it is a further object of my invention to provide a highly practical type of commercial machine especially adapted to the system of my invention.

This machine is so constructed that it operates from a constantly changing group of differently mixed up alphabets, the number of alphabets used being practically unlimited and only one letter called a primary letter is used from any alphabet.

Coding machines have been designed and built, but all have suffered from the very serious handicap of inflexibility of code, so that, (barring the very few simple selections of starting positions placed at the option of a pair of correspondents using the machine of the prior art), once the construction of this machine had been obtained by a cyptographic expert it was a relatively simple matter for him to decipher any message coded thereby. It is one object of my invention to provide an improved system and machine which can code a message undecipherable by any expert, no matter how familiar he may be with the construction and operation of the system and machine. It is an object of my invention to provide a maximum range of selection of different key and starting conditions for the option of correspondents using the machine. As a further safeguard I have provided means for guarding the secrecy of the key conditions of any machine, so that discovery even of the starting conditions agreed upon between correspondents would be useless to a cryptographer who was equipped with a similarly constructed coding machine; it being an important characteristic of the machines of my invention that lack of correspondence in two machines of any one of the manifold adjustable key conditions provided in each, will make it impossible to decode on one machine, a message coded on the other.

In the design of an improved coding machine I have striven for simplicity, compactness, ease and foolproofness in operation, as well as for durability and low cost.

In the working of my machine, certain movements are entailed, and it is an object of my invention to provide special structures for respectively permitting, controlling, and producing this motion, and I have striven for certain advantageous characteristics of these structures; which features will appear or be suggested as the description proceeds.

Having selected the electric coding machine as set forth in a number of prior patents issued independently and jointly to me, I have set out to improve this superior type of machine in a thoroughgoing manner. Many of the improvements are not specifically referred to in the "objects of invention"; the body of the specification being relied upon to imply these many objects.

Other and ancillary objects of my invention will be set forth or suggested by the following description of my invention or in the use thereof. Certain objects of my invention are attainable with the use of less than all its advantageous features, and with modifications and permutations within its purview. I desire not to be circumscribed beyond the reasonable limits of the claims finally determining my invention.

Throughout this description I have consistently used the term "decipher" in connection with the attempts of unauthorized persons to break the code, in contradistinction to the term "decode", which refers to the interpretation of the code message by authorized persons. The distinction is arbitrary and has been made merely for convenience.

Devices and systems in the art of cryptography may generally be divided into two classes; one relying upon such simple tricks as writing messages backward, adding dummy symbols and like confusing expedients; and the other involving some thoroughgoing plan of introducing complexity, such for example, as that of the Vigenere* cryptographic table. As soon as the trick is discovered in the former class, the message may be deciphered in the same manner in which it would be decoded. In the latter class however, deciphering must follow a less direct plan, ---
*See Langie—"Cryptography," Constable and Co. Ltd. London.

such as that involving letter-frequency probabilities. My invention belong to the latter class, and it is to be emphasized that modifications thereof by such tricks as are contained within the first-mentioned class are mere permutations within the purview of my invention. Where my system, for example, calls for a certain continuity or sequence, the introduction of some such trick to break the continuity or sequence must reasonably be interpreted as not without the scope of my system. It is to be expected that someone may desire to complicate the system of my invention by simply combining it with some well-known system of the latter class above defined. I desire to be protected from the infringer who would thus adopt my invention and attempt to make it behind some other cryptographic system. A thorough mastery of the matters taught by my invention and the description thereof will suggest countless such modifications within its purview, and any interpretation of the claims to my invention should therefore rest upon a similar mastery of the matters herein taught, and upon an understanding of the fact that most of the past efforts in cryptography were directed to precisely such confusing combinations and modifications of well-known systems, in an effort to outguess crytographic experts. It is to be emphasized that, unlike such confusing complications and modifications, my invention entails the production of a complex code which does not become decipherable when the details of the coding system or machine are guessed or disclosed.

Figure 2:
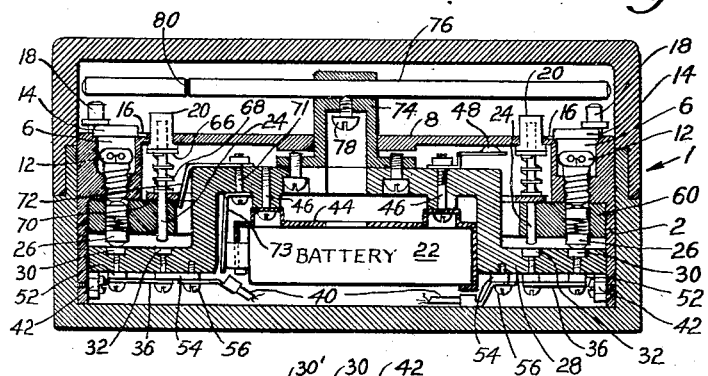
Figure 3:
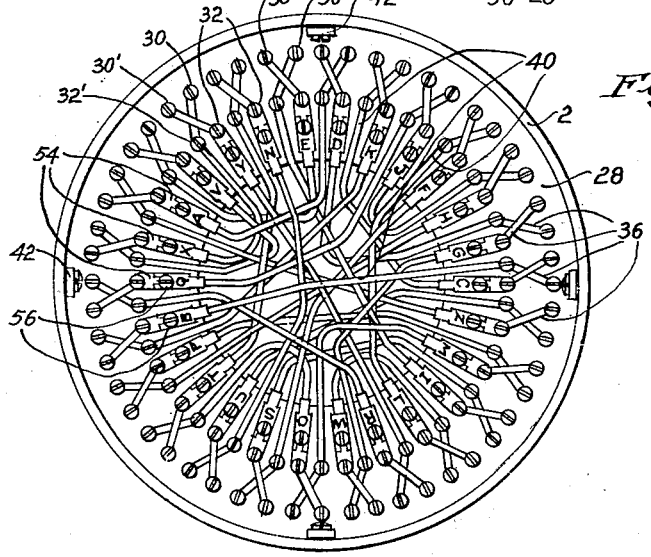

Referring to the drawings:

Figure 1 is a top plan view of the elemental machine of my invention; Fig. 3 is a bottom plan thereof; and Fig. 2 is a vertical diametral section of the elemental machine in its carrying case. Fig. 4 is a representative wiring diagram of the elemental machine simplified by showing only three of the twenty-six circuits.

Fig. 5 is a top plan view of the five-wheel indicating code machine or portable multicoder of my invention. The top flange on each side wall of the machine has been broken away to disclose certain parts thereunder. Fig. 6 is a vertical median longitudinal section of the machine with its middle code wheel removed. The plane of section is indicated by a line 6—6 in Fig. 5. Figs. 5 and 6 taken together constitute a representation (showing only two of the twenty-six circuits) of the electric wiring of the machine. Fig. 7 is a right side elevation of the machine as viewed in the direction of arrow 7 in Fig. 5. Fig. 8 is a skeleton perspective of the code-wheel-actuating dogs and associated mechanism as viewed in the direction of arrow 8 in Fig. 5. Fig. 9 is a perspective detail of two dogging pins removed from the assembly of Fig. 8.

Figure 13:
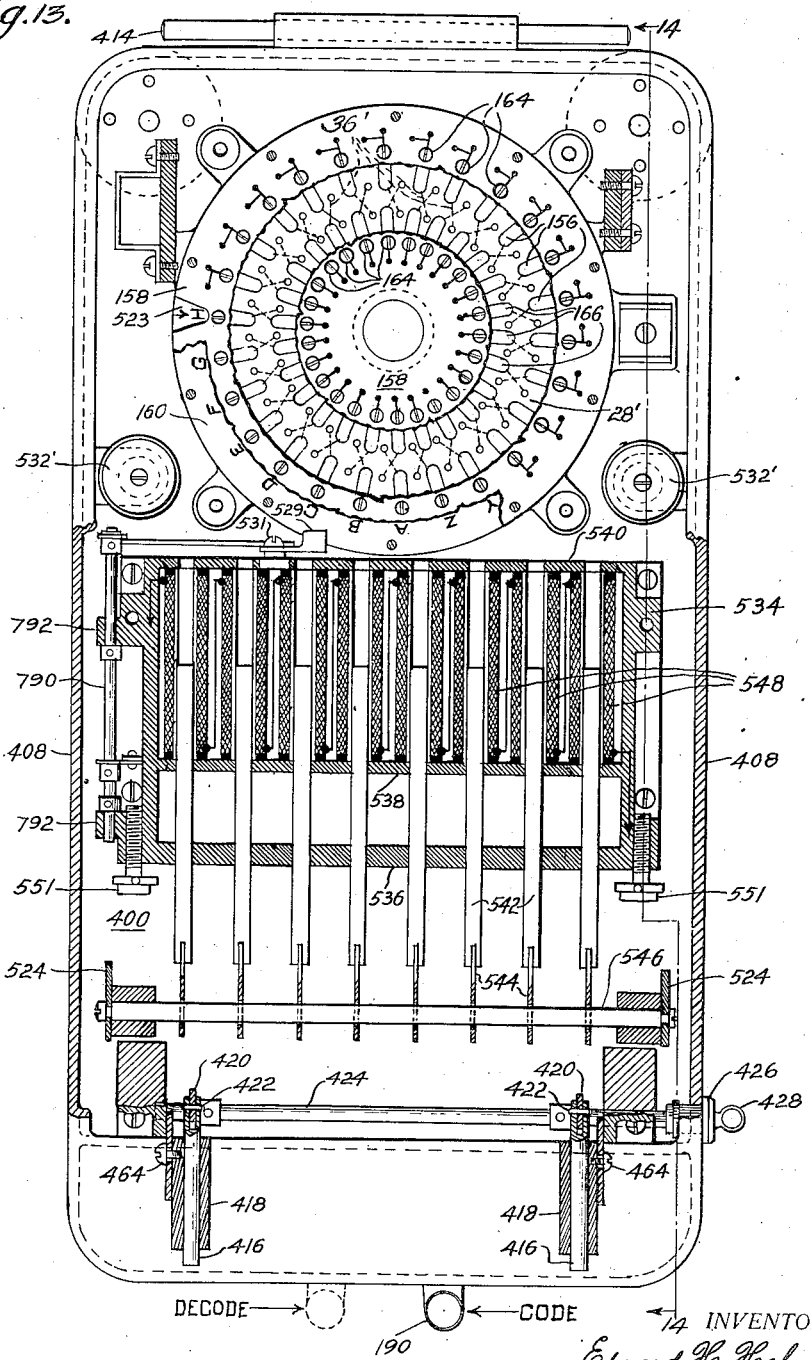

The upper half of Fig. 10 is a diametral section longitudinally through the code-wheel unit common to both the five-wheel indicating and recording machines. The plane of section is transverse of and inclined relative to either machine as a whole, and is represented by lines 10—10 in Figs. 6 and 11. Fig. 10, taken as a whole, is a wiring diagram of the five-wheel recording code machine showing only two complete circuits. Fig. 11 is a vertical approximately median section, analogous to Fig. 6, of the five-wheel recording code machine. The plane of section, which is indicated by a line 11—11 in Fig. 12, is displaced slightly to show the middle code wheel and associated dog mechanism in true elevation. Fig. 12 is a top plan view of the machine with its cover and type-buffer bars removed. Fig. 13 is a sectional plan directed down upon the base portion of the machine. The plane of section is indicated by a line 13—13 in Fig. 11. In Fig. 13 annular sections of the commutator brush-retaining plate have been broken away to show the commutator beneath.

Fig. 14 is essentially a right side elevation of the machine with the cover removed and base frame broken away by a vertical section longitudinally through the base frame near the right side thereof. The plane of section is represented by lines 14—14 in Figs. 13 and 17. Fig. 15 is a fragmentary enlargement of a left-hand portion of Fig. 14 with certain parts cut away to show the electrical switch features associated with the keys. Fig. 16 is a fragmentary perspective view of the keyboard housing and associated parts, but with the keys removed. Fig. 17 is a vertical transverse section of the machine through the rear portion thereof and diametrically through the type-actuating mechanism. The plane of section is indicated by lines 17—17 in Figs. 11 and 12. Fig. 18 is a fragmentary left side elevation, in the direction of arrow 18 in Fig. 12, of the rear portion of the machine with type superstructure removed, showing the mechanism for driving and splitting the printed tape. Fig. 19 is a fragmentary section on the line 19—19 of Fig. 18 showing the five-character spacer of the driving mechanism. Fig. 20 is a fragmentary plan of the spacer shown in Fig. 18. Fig. 21 is a skeleton front elevation of the reversing lever and linkage associated therewith for making the various adjustments provided when shifting between coding and decoding operation.

Fig. 22 is a plan of a sample printed tape as it leaves the type mechanism; and in line with each code letter thereof, is given the character alphabet sequence of the machine at the instant said code letter is printed; to indicate that the entire sequence is changed after each character is printed.

Midget coder (*Elemental commutator reversing code machine*)

I will first describe the features of my invention which I have incorporated in simplest form in the midget coder illustrated by Figs. 1 to 4.

An encasing member 1 is simply a packing case to provide for transporting this elemental device of my invention, and forms no part thereof. It is illustrated to emphasize the fact that this elemental machine is a complete working device as it stands; even though it forms a relatively small subcombination of the more elaborate final multi-coder forms of my invention later to be described in detail.

A cylindrical metal base frame 2, has a perimetrically arranged plurality of standard (flashlight bulb) electric sockets formed, by depressions 6 on a circumference near the periphery, in its top end wall 8. The depressions, and the bulbs 12 within them, are covered by plane lenses 10, each having a character etched thereon. The characters are, in this case, letters of the English alphabet, and such numbers and other characters as are found convenient to transmit in code messages. The lenses are held in metal frames 14 each having a positioning tab 16 projecting beyond and below its body. A shallow counterbore at the top of each depression 6 receives the lens with its frame, and a further slight depression beyond the counterbore at one point receives the positioning tab 16 of the lens frame. Cap screws 18 are screwed into the top wall 8 between each pair of lenses to clamp them in position. The cap screws may be loosened at any time and the lenses shifted to any desired position, as one means of altering the code.

In radial line with each character-bearing lenses 10 is a push button 20, and means are provided whereby pressure upon any push button, will cause response of a light under one of the character-bearing lenses. Thus, for example, if the push button adjacent the lens bearing "H" character were pressed, a light under "L" lens might light so that "L" and "H" characters would be related so that one was the code symbol for the other. Thus "L" might be designated by "H" or "H" might be designated by "L", and the electric wiring between the two characters constitutes a designated interconnection therebetween.

These wiring connections between the push buttons 20 and the bulbs 12 are such that any given push-button is not necessarily in series with the bulb adjacent thereto. As the description proceeds, the subscripts "a", "b", "c", etc., to "z", will be used after the number of any element in the structure to designate its position relative to any given arbitrary positioning of the language characters. Thus 10$b$ would designate the lens having the character B etched thereon, while 20$b$ would designate the adjacent push-button in radial line therewith. Obviously the number of characters is not limited to the twenty-six letters of the English alphabet, for numerals, signs, and word-space designations might be added. In fact, as will be explained later, the use of a code symbol to represent word spaces constitutes an important feature of my invention, and while I have preferred to utilize the infrequently-used letter "Z" for that purpose, it would be possible to add a twenty-seventh symbol for that purpose.

The wiring connections will be explained first with reference to the wiring diagram (Fig. 4), in which but three character positions are shown instead of the total twenty-six for a complete alphabet. The bulbs 12e, 12i, and 12t each have one terminal grounded to the frame of the machine, and a dry-cell battery 22 has its negative terminal grounded to the same frame. The battery 22 has its positive terminal connected, through the electrically parallel set of push-button switches 20e, 20i, and 20t, to a set of (push-button) commutator brushes 24e, 24i and 24t, one in series with each push button. The set of (bulb) commutator brushes 26e, 26i and 26t are insulated from the push-button commutator brushes, so that they may be connected thereto only through the channels determined by a commutator 28 arranged to contact with the two sets of brushes. The commutator is wired, (see commutator wires 40 plus cross wires 36), to connect the push-buttons to bulbs out of line therewith, so that the language character marking any push button may be transformed into a code character illumined by a bulb electrically connected therewith. The commutator 28 is of insulating material provided with an outer annulus of (bulb) contacts 30, one for each bulb brush 26; and an inner annulus of (push-button) contacts 32, one for each push-button brush 24. Wiring within the commutator connects each contact 30 with some (any) one contact 32.

Fig. 4 represents the commutator in neutral position; it being understood that in operation the commutator would have to have its contacts touching the commutator brushes. Assume the commutator to have been turned clockwise through a slight angle to bring contact 30e under brush 24e. This will also bring every other brush into contact with its correspondingly characterized contact. This will arbitrarily be termed a "coding position" of the commutator. In this position and with the wiring illustrated by Fig. 4, (which wiring is arbitrary and purely illustrative), it would be possible to transform the word "tie", for example, into code by pressing push buttons 20t, 20i and 20e successively. This would cause the lights 12e, 12t, and 12i to light up in succession; spelling "eti" which would be the code for "tie". Of course with twenty-six different characters instead of only three, the possible complications between code and language characters become correspondingly multiplied.

Having already described the means (and one commutator position and sample operation) for coding, I shall next describe the means for decoding, after which the means for reversing from one function to other will become apparent.

Positioned in the same annuli of the commutator as the (forward) contacts 30 and 32, are two other interspaced series of exactly similar (reverse) contacts 30' and 32', all the same distance in the same direction from their corresponding contacts 30 and 32 so that when the commutator 28 is rotated slightly counterclockwise, the contacts 30' and 32' will lie under the brushes in the positions formerly occupied by the contacts 30 and 32. This counterclockwise position will henceforth be referred to as the "decode" or reverse position, in contradistinction to the forward or "code" position. Each set of four commutator contacts 30, 32, 30' and 32' is designated by a single code or language character; e. g., the set designated by character "E" is 30e, 32e, 30'e, and 32'e, but it will later be shown that this designation is a purely arbitrary one, since the commutator is rotatable with respect to the character-bearing lenses 10.

When the commutator is in "code position" the contacts 30' and 32' are inoperative so far as contact with the brushes is concerned, and when in "decode position" the contacts 30 and 32 are similarly inoperative. These contacts however, remain in circuit, by reason of pairs of cross-wires 36 permanently connecting the contact 30 of each set to its radially adjacent contact 32' in the same set, and connecting the contact 30' of each set to its radially adjacent contact 32. Thus contact 30e is connected in series with contact 32'e, contact 30'e in series with 32e, 30i with 32'i, etc. These cross-connected contacts function as a reversing switch so that if pressing push button 20t causes bulb 12e to light when the commutator is in "code position", then when the commutator is rotated through the slight angle to "decode position", pressing push button 20e will cause bulb 12t to light. To decode the code word "eti", it is necessary to merely press the push buttons in radial line with the letters "E", "T", "I", on the lenses, when the commutator is in decode position, and the bulbs 12t, 12i and 12e will light successively; spelling the word "tie".

The designating interconnections for use during coding operation, though they incorporate elements in common with the inverse designating interconnections for decoding operation, are truly alternative thereto. It is this use of alternative interconnections which permits either set of interconnections to be connected at random between the characters. It will be noted that by reason of the reversing commutator many elements of the interconnections are made to serve a double function; the electric current being sent through these elements in opposite directions during coding and decoding operations. All the wires 40 are in circuit in either code or decode position of the commutator, and the only elements which go into disuse are certain of the cross-wires 36. By this expedient a great deal of mechanical and electrical complexity is avoided.

The code and decode positions of the commutator have been designated arbitrarily and may be interchanged in use; the important consideration being merely to shift from one position to the other so as to reverse the circuits when changing from coding to decoding operation.

So far it has been pointed out that the character-bearing lenses may be interchanged to change the code, and that the designation of code and decode positions may be arbitrarily interchanged. Either of these expedients, open to the owner of a coding machine, may be utilized to entirely change the code so as to make the unauthorized deciphering of the code more difficult.

To further complicate the code, means are provided for shifting the incidence of the designating interconnections between characters to change, not only the code, but the code sequence as well. By code sequence is meant the order in which letters of the code alphabet follow each other. This is illustrated in Fig. 22, wherein no discoverable sequence persists through the several code alphabets arranged one above the other to the left of the message-bearing tape 700. Shifting the incidence of said interconnections does more than bodily change the relation of the code alphabet to the language alphabet; it mixes up the order or sequence in which the code letters follow each other. In the midget coder this shift of incidence is accomplished by rotating the commutator 28 (beyond the range of shift from code to decode position), to bring different sets of contacts under each given set of brushes. Thus for example, in Fig. 4, the commutator might be rotated through 120 degrees to bring contacts 30e and 32e under brushes 26t and 24t. It is contemplated that the commutator will be rotated after a specifiable number (preferably only one) of push-buttons have been depressed, so that the code will not repeat itself each time a given character is coded. The selection of initial commutator position and of the interval, direction and amount of movement is then open to selection and change by the owner of the machine. Thus he might elect to start coding with the contacts 30e and 32e in radial line with the bulb 12t, and to rotate three (or preferably only one), full spaces counterclockwise after each letter has been coded. To decode, it would then be necessary to set the machine to within a fractional space of the same initial position to attain the "decode position" nearest thereto; i. e. with the contacts 30'e and 32'e in radial line with the bulb 12t; and to rotate three (or one) full spaces counterclockwise, as before, after each letter has been decoded.

Considering the wiring of the machine in its broader sense as constituting designating interconnections between characters, it will be appreciated that each designating interconnection is broken up into relatively movable (see movable commutator) parts or links. Thus each commutator wire 40 taken with its appropriate cross-wire 36 constitutes a link supported by the commutator disk and movable therewith relative to the code and language characters, whereby the incidence of the transitory or changeable designating interconnections between characters may be shifted. And it should be noted that any of said wires 40 plus 36 may be connected to any character by merely rotating the commutator. Statement that the commutator contacts are arranged in rings is relied upon, to imply the fact that the movable links of the designating interconnections are arranged circularly, i. e. perimetrically, so that any link may be moved to any character.

In the commutator described in my prior Patent, 1,510,441 of Sept. 30, 1924, and therein termed "code wheel", it was necessary that the two sets of commutator contacts be connected inversely in complementary pairs in order to permit inversion from coding to decoding operation. Thus, for example, if character —H— contact in one ring of contacts where connected to character —Y— in the other ring, then character H in said other ring, would have to be connected to character Y in said one ring. The commutator of my present invention is not so limited, and I have provided means for reversing either way from coding to decoding operation. This is an important feature of the present case, and, since it is incorporated in the commutator 28, I shall henceforth term this, and all other commutators including the reversing feature, "reversing commutators". It will be understood, however, that reversing commutators may have other functions in addition to that of reversing the electric circuits.

Relating the foregoing explanation of Fig. 4 to Figs. 1, 2, and 3:

The commutator 28 is in general an inverted-dish-shaped body of insulating material and of an outside major diameter equal to the inside diameter of the cylindrical base frame 2. The bottom of the base frame is open, to permit insertion of the commutator, and a plurality of cap screws 42, in the lower portion of the casing 2, project from the inside cylindrical face thereof to retain the commutator journaled within the casing. The battery 22 is conveniently carried within the dished portion of the commutator by a metal saddle 44. The saddle is secured to the commutator by bolts 46, is in electrical contact with the negative terminal of the battery, and is grounded to the frame through a resilient metallic brush 48 clamped at one end by one of the bolts 46, and having its other end sprung up into contact with the under surface of the top end wall 8 of the metal frame.

The annuli of contacts 30 and 32 (including contacts 30' and 32') are clearly shown arranged in two concentric rings near the periphery of the commutator. There are four contacts for each of the twenty-six character spaces of the machine. The contacts are simply bolts pressed into complementary counterbored holes in the commutator, with the tops of their heads (or nuts) ground off flush with the upper surface of the commutator. The lower ends of the bolts constitute terminals projecting below the commutator to receive the contact washers 52, for the cross-wires 36.

As an aid to interchange of terminals, bus bars 54 take the place of washers in the inner ring of contacts 32 and 32' and these bus bars are provided at their inwardly extended ends with contact screws 56 to receive the terminal prongs of the commutator wires 40. This provision for interchange of terminals provides another means by which the code arrangements of the machine may be altered to suit any correspondents. By merely shifting the wires 40, the code relations of the machine may be entirely changed to confuse the unauthorized person attempting to decipher a code.

It should be noted that, from an electrical standpoint the wires 40 could as well be connected between the outer ring of contacts 30 and 30' (because of the cross-connecting wires 36), or they could be connected between the contacts 30 and 32, or between the contacts 30' and 32'. Where connection is to be made to the outer ring of contacts it will be found desirable to use longer bolts for these outer contacts, and to use axially elongated washers 52 therefor, to support the wires 40 in spaced relation below the inner ring of contact terminals.

The commutator brushes 24 and 26 are retained above the commutator in an annular brush-retaining block 60 of insulating material non-rotatably pressed into the casing 2. The brushes 26 are capped spiral contact springs carried in loose holes, one beneath each bulb 12, and in contact with the positive terminal thereof; the negative bulb terminals being grounded to the frame of the machine through their sockets in the metal top wall 8.

The brushes 24 are elongated pins having the push buttons 20 pressed upon their upper ends, so that the push-button switches 24—32 or 24—32' are intimately associated with the reversing commutator in this elemental machine. The push buttons are retained by flanges 66 on the pins 24. The push buttons extend up through holes in the top wall 8 of the casing and are urged upward by spiral springs 68 surrounding the brushes 24 between the push buttons 20 and the brush-retaining block 60.

An annular metal contact ring 70 having an inner diameter slightly less than that of the insulating block 60, has a ring of holes registering with the brushes 24, and is interposed between the block 60 and the springs 68 to connect the brushes 24 to the positive terminal of the battery. A resilient metallic contact brush 72 is supported at one end by a bolt 71 through the insulating material of the commutator and has its other end sprung out into contact with the metal ring 70. A spring clip 73 is clamped against the positive terminal of the battery 22 by the other end of bolt 71 and so completes the circuits from the battery through the push buttons and commutator to the bulbs, and back through the frame to the battery.

The means for rotating the commutator consists of a hub 74 bolted to the top of the commutator and projecting up through a central hole in the top wall 8 of the casing. A transverse hole in the top of the hub receives a rod 76 which constitutes a double-ended crank arm and is retained by an axial screw 78 in the hub. The crank arm 76 also constitutes an index pointer having one end distinguished from the other end by a mark 80. When the rod is directly over any one lens, the commutator is in "coding position" for the character etched on said lens. The half-spaces for "decoding position" are marked by the cap screws 18.

To the several means for complicating codes so-far mentioned as possible with this midget coder, two others may be added. Either end of the crank arm 76 may be designated the index pointer, and the angular relation of the hub 74 to its commutator may be altered at will by merely loosening the set screw 78, turning the hub to a new position, and tightening the set screw.

The midget coder could be used to code and decode messages even without its electrical features by merely allowing one end of the index pointer to designate the code of the character under the other end of the movable pointer. In this case the index pointer would constitute a designating interconnection between the two characters under its opposite ends. Conversely, the coder might be operated without the rotatable code-changing feature of the commutator by never rotating the commutator. These apparently obvious methods of use are pointed out as indicative of the wide range of choice open to correspondents using this cryptographic machine.

It is, throughout, one object of my invention to provide a machine which the operator may use in a variety of different ways to foil the unauthorized person who would decipher the code; so that no amount of familiarity with the construction of the Hebern coding machines in general, or with any particular coding machine of this class, or even such inside formation as the knowledge of the particular wiring and starting position used on a particular machine, would be effective to permanently destroy secrecy. The operators of the code machine could foil such unauthorized spying by merely agreeing to change the wiring, starting position, arrangement of lenses, hub position, or interval and amount of commutator movement during coding. There are so many possible combinations and permutations or complications of this sort open to the operator that he can make it practically a hopeless task to attempt to guess the particular combinations, permutations, and complications which are used by any particular correspondents. These combinations, permutations, and complications will henceforth be referred to as the "key and starting conditions", since, when they are all known, the key to decoding the code messages is had. "Key conditions" refer to such features as the commutator wiring, and arrangement of lenses which are ordinarily not altered during the coding and decoding operations; while "starting conditions" refer to such features as the initial position of the index pointer, and are reset after each message. There is, however, no rigid distinction between the two, for what one pair of correspondents may consider a key condition, another pair will alter after each operation. Moreover, in the more advanced designs of my invention now to be described, it becomes practicable to relegate formerly important starting conditions to the sphere of infrequently altered key conditions.

*Multiple commutator code machines (multi-coders)*

The simple and inexpensive midget coder performs its functions to even better advantages than prior costly highly complex pieces of cryptographic mechanism heretofore used, and is intended for use wherever code is used on any but a large scale; but where a large amount of code message from a given machine is obtainable by an unauthorized person he may employ means, such as tables of letter frequencies and the like, for deciphering the code. The midget coder is equipped to combat such means of deciphering, only by frequently changing the key conditions and by excessively complicating the matter which the operator has to remember when coding and decoding the message. I have provided automatic means, independent of the personal equation, in my multi-code machines for continually changing the key or starting conditions in a highly complex fashion, and these in turn are provided with a hierarchy of key and starting conditions subject to selection by an operator.

The more complex (multi-code) machines of my invention incorporate the reversing commutator of the midget machine. In these multi-coders, auxiliary means are provided for altering the code circuits so that code-changing rotation of the reversing commutator becomes of relatively less importance, and is retained merely as an adjustment by which the key conditions of the machine may be altered. In the multi-code machines, the wires 40, instead of being direct-connected between the commutator contacts, as in Fig. 4, have auxiliary means for altering code circuits interposed in series therewith.

The auxiliary code-changing means, Figs. 5, 6, 7, 8, 9 and 10, is formed by auxiliary (code-wheel) commutators 82, each having two rings of contacts 84 and 86, on opposite radial faces thereof, and analogous respectively to the contacts 30 and 32 of the reversing commutator. Each contact 84 on one side of a code-wheel commutator is connected by a wire 88, constituting a link in a designating interconnection, to some (any) one contact 86 on the other side. The code-wheel commutators do not embody the reversing feature, and therefore have no need for an interposed ring of decoding contacts analogous to 30' and 32'. Instead of four contacts per character as in the commutator 28, each code-wheel commutator 82 requires only two contacts per character, or a total of fifty-two contacts for the English alphabet. The code-wheel commutators are modifications of the code-wheels described in Patent 1,510,441, Sept. 30, 1924, to E. H. Hebern. From an electrical standpoint the only essential difference is that in this early patent it was essential to operation of the device that the commutator contacts on opposite sides of the code wheel be reciprocally connected by the commutator wires; so that if a wire connected contact "H" on the left side, to contact "Y" on the right side, a complementary wire was required to connect "Y" on the left side, to "H" on the right side. Otherwise the machine would not decode. In the present invention however, the contacts on one side of the wheel may be connected absolutely at random to the contacts on the other side. The reversing commutator feature permits decoding regardless of this arrangement of wires in the code wheel commutators. The code wheel commutators constitute rotatable supports for the groups of links or wires 88 which they embody, and will at times be referred to merely as supports, and at other times, more specifically, as code-wheels.

To adapt the reversing commutator 28, shown in Figs. 2 to 4, to the complex machines, each wire 40 of the former is in part replaced in the latter by two leads or links 40′ and 40″, shown in Figs. 5, 6 and 10, so that the auxiliary code-changing (code-wheel) commutators may be connected in series therewith. The original terminal connections remain unchanged so that any pairs of wires 40′ and 40″ if connected in series, would be equivalent to the wire 40 of the first embodiment. The wires 40′ and 40″ are connected in series through a plurality of code-wheel commutators. The end of each wire 40′ remote from commutator 28 terminates in a commutator brush 90 (Fig. 10) over the contacts 86 on one face of the code-wheel commutator, and the other end of each wire 40″ remote from commutator 28 terminates in a similar commutator brush 92 over the contacts 84 on the other face of the code wheels. By rotating a code-wheel commutator between the brushes 84 and 86, just as the reversing commutator 28 in the midget machine had been rotated through whole spaces, the code may be changed during operation of the multi-code machines just as it had been altered in the elemental or midget machine. As so far described, the complex machines merely embody one added key condition (viz. adjustable rotation of the reversing commutator), over the elemental machine.

In the complex machines, employment of but a single code-wheel commutator would fail to exploit the fullest advantage accruing from the more advanced design. Actually, five code-wheel commutators are employed in series, each between a pair of brushes. For convenience, these code-wheel commutators and their brushes will be numbered from left to right by subscripts. Thus, referring to the upper portion of Fig. 10, commutator $82_1$, is placed between brushes $90_1$ and $92_1$; brushes $92_1$ are connected to brushes $90_2$; commutator $82_2$ is placed between brushes $90_2$ and $92_2$ (not shown); and so on.

In the drawings these subscripts will be applied to the code wheels and to certain representative elements associated therewith, it being understood that they are applicable to every element of, or directly associated with, each separate code wheel. It should be noted that the number of key conditions is greatly extended, by these auxiliary commutators, for each commutator 82 may be wired differently, may be bodily inverted in the machine, or may have its wiring changed at will, and each may be rotated to a different position and may be connected for rotation in different sequence.

Means are provided for interconnecting the code-wheel commutators for rotation, so that the elemental key conditions may be automatically altered. The code wheels are interconnected so that: after one has moved through a certain number of steps, a second one will move a predetermined amount; after the second has moved through a certain number of steps a third will move a predetermined amount; and so on. The code wheels are interconnected to move in progressive non-recurrent succession. In the ideal application of this type of movement each code wheel is placed successively in every possible position relative to every other code wheel, to exhaust the possible tortuous paths therethrough between each character. As will be explained later, the preferred type of relative movement is that in which each code wheel is advanced one step after the wheel of next higher speed has completed the major portion of its revolution and before it has begun to repeat itself. In the elemental machine, the code sequence will begin to repeat itself after twenty-six operations (turning through one whole commutator space after each character has been coded) unless the key conditions are changed by the operator. In the five-code-wheel machines so far described, it has been calculated that a code sequence will not repeat itself within twenty-six-to-the-fifth-power, operations; after which each possibility of change of any final key condition by the operator will produce another 11,881,376 sequences.

In the multi-code machines as described so far, the designating interconnections are split into several different groups, each supported by one commutator, and movable with respect to one another as well as to the characters they interconnect. Where the interconnections in the midget coder each had but a single movable link, those in the multi-code machines have a plurality of movable links arranged perimetrically in groups, and each movable relative to the other links of its series; and means are provided for moving each of these groups successively to substantially exhaust the possible incidences of the linkages.

The more elaborate device of my invention will first be described in detail as applied to an indicating code machine, and will later be described in its most advanced form as a recording code machine.

In the drawings, Figs. 5, 6, 7, 8, 9 and the upper half of Fig. 10 are unqualifiedly representive of the indicating code machine first to be described. In describing this indicating code machine however, infrequent reference will be made to specified portions of Fig. 11 and the lower half of Fig. 10, where these figures show elements common to both multi-code machines, to better advantage than do Figs. 5 to 9 inclusive.

*Portable multi-coder (five code-wheel indicating reversing code machine) (see Figs. 5, 6, 7, 8 and 9)*

A substantially rectangular metal base-frame 100 has a pair of upstanding metal supporting walls 102 bolted thereto at its opposite sides at its back portion, and is provided with a front superframe of insulating material for housing the push-buttons and indicating lights. The front portion of the base frame is without a top wall, to provide a rectangular opening; which opening is then covered by the insulating base plate 106 of the front superframe. Above the front part of the base plate 106 is the inverted box-like push-button housing 108, forming the front portion of the front superframe. The rectangular opening of the housing is enlarged for a slight distance above its bottom to receive the horizontal metal push-button contact plate 110 which is secured to the housing by bolts 112. The plate 110, and the top of the housing, are provided with a plurality of aligned holes to receive push-buttons 114. The push buttons are metal pins each provided with an annular flange 116; the upper surface of which is adapted to bear against the top of the housing to retain the push buttons. A coil spring 118 surrounds each pin between the flange 116 and the plate 110 to hold the push buttons in raised position. Caps 120, of insulating material top the push buttons, and each cap is provided with a different language or code character printed thereon; in this case being merely the English alphabet arranged as in an ordinary typewriter. Fixed metal contact pins 122 are received by openings formed for them in the insulating base plate 106, and one beneath each push button pin. When any push button is depressed upon its contact 122, it completes a circuit which will later be described as including one of a plurality of electric light bulbs 124.

The bulbs 124 are housed in a box-like bulb housing 126 which forms the rear part of the front superframe. The housing 126 has its bottom resting upon an insulating plate 128, which in turn rests upon the base plate 106. The housing 126 has a plurality of depressions to receive the electric light bulbs, and the depressions are covered by a two-ply translucent plate 132 having language and code characters printed thereon, one above each depression. The translucent plate is covered by a metal retaining plate 134 having openings above each depression to reveal the illumined characters. Bolts 136 secure the plate 134 to the housing. A metal plate 138 closing the bottom of the housing has standard screw sockets formed therein for the bulbs. The plate constitutes the negative contact terminal for all the bulbs. The positive terminal of each bulb is contacted by one of a plurality of capped springs 140 similar to the springs 26 aforedescribed, and guided in holes through the plate 126 in line with the bulb sockets. Contact pins 142, exactly similar to the pins 122, are also provided in the plate 106; one in line with each bulb and in contact with each spring.

The electrical connections between these two sets of pins 122 and 142; i. e. between the push buttons and bulbs; will next be described.

A dry cell battery 144, having a positive terminal 146 and a negative terminal 148, is conveniently retained by a pair of insulated clips against the side wall 102. The plate 110, forming one terminal of each push button switch, is connected to the positive battery terminal 146 by a wire 152. Each complementary push-button switch terminal 122 is connected by one of the wires 154 to one of the reversing-commutator brushes 156 annularly arranged upon a brush-retaining disk 158, of insulating material. The disk 158 closes a circular opening in the top of the rear part of the base frame 100, and is secured to the top of the rim 160, surrounding this opening, by bolts 162. The brushes 156 are flat brass springs slightly convexed at their outer lower ends and secured at their inner ends to the disk 158 by bolts 164 through the disk. The projecting upper ends of bolts 164 serve for attachment of the terminals of wires 154 from the push-button switches. The brush-retaining disk 158 is provided with an annular depression below the free ends of the resilient brushes to permit them to spring. Concentric to and within the ring of brushes 156 is a second annulus of exactly similar brushes 166 similarly secured by bolts 164. Wires 168 lead one from each of these latter brushes to each of the contact pins 142 of the positive bulb terminals. Wires 170 and 171, lead from the negative bulb terminal plate 138, through a master switch 294—296, Fig. 7, to the negative terminal 148 of the dry cell. The master switch may, for present purposes, be assumed always to be closed, so that the only gap to a complete circuit from the push buttons to the bulbs, lies between the two rings of commutator brushes 156 and 166.

The circuit connecting the brushes of these two rings will next be described.

The circular opening in the rear part of the main frame 100 is counterbored at its top to rotatably receive the reversing-commutator disk 28' with its upper surface flush with the rim 160, and therefore touching the brush-retaining disk 158. A circular opening in the disk 28' is journaled upon an annular flange 174 depending from the disk 158. The commutator contacts 176, 178 and 176', 178', (Figs. 6 and 10) are, in all essential respects, like the contacts 30, 32, and 30', 32' in the analogous commutator 28 of the elemental machine, and they are similarly joined by cross wires 36' to constitute, with their brushes 156 and 166, a reversing switch permitting change from coding to decoding position.

A reversing lever is provided for shifting the commutator 28'. A disc-shaped plate 182 has its rim bolted to the bottom of the reversing commutator near the periphery thereof, by an annulus of bolts 184; and the reversing lever 186 is pivoted at its inner end to the center of plate 182 by a pin 188. The outer end of the lever extends along the bottom of the machine to the front thereof and terminates in a shift handle 190. The threaded bolt holes 192 in which the bolts 184 are received, are continued through the rim of plate 182 to receive a thumb screw 194 passing through a hole in the lever 186. When the thumb screw is removed the reversing commutator 28' may be rotated to any desired position, just as the analogous commutator 28 may be, to alter the code. For convenience, the shift lever 186 is provided, so that when once adjusted to desired position, the reversing commutator may be shifted from code to decode position without inverting the machine. Though the commutator might conceivably be rotated, as by ratchet means or the like, after each character had been coded, it is not deemed necessary to do this, in view of the auxiliary code-changing means now to be described.

Instead of interconnecting the reversing commutator contacts as in the elemental machine, directly by fixed wires 40, one for each pair of contacts 32 (Fig. 4); separate wires 40' or 40'' from each contact 176, (or other of the four contacts 176, 176', 178, 178' of each set), in the complex machines lead to opposite brushes 90 and 92 of the code-wheel commutators 82, (Fig. 10). The brushes 90 and 92 are similar in all respects to the resilient flat brass brushes 156, and are bolted to the inside face of oval brush-retaining plates 200 by bolts 202 which form the terminals for wires 40' or 40'' from the reversing commutator 28'. These plates 200 are grooved annularly to permit the brushes to spring.

A central opening in each plate 200 receives a shaft 204, and journaled on this shaft, with their radial faces bearing between the inside faces of each pair of brush-retaining plates 200, are the rotatable code-wheel commutators. Each code-wheel commutator is a wide-rimmed metal spider 82 (Fig. 10), having an opposed pair of annular similar insulating plates 208 clamped together upon opposite sides of and including the narrow spider web, by a ring of bolts (not shown), just within the rim of the spider. The commutator contacts 84 and 86 are bolts each extending through one of the plates 208 and having their heads flush with the outer face of the plate to form an annulus of contacts on each side of the code-wheel commutator. The threaded ends of the contacts 84 and 86 project slightly beyond the inside faces of their plates 208 to receive bus-bars 214 similar to the bus-bars 54 in commutator 28. Annular insulating plates 216 separate the bus-bars from the spider. Commutator wires 88 each have one end connected to a bus bar on one side of the commutator, and extend to some (any) other bus bar on the other side of the spider, so that each contact 84 on one side of the commutator is connected, by one link 88 in the series making up each designating interconnection, to a contact 86 on the other side of the commutator; and, just as in the reversing commutators previously described, these commutator wires may be shifted at will to alter the circuits through the commutator.

As has been mentioned, there are actually five rotatable code-wheel commutators, but each is identical, in its constructional aspects, to that aforedescribed, and each is included between a pair of similar brush-retaining plates 200. In all but the two end brush-retaining plates, the brushes 90 and 92 on opposite sides of a given plate are connected directly in series by the simple expedient of retaining both of them in common by a single row of bolts 202. The end plates, of course, have brushes only on one face thereof; which brushes are direct-connected to the wires 40' and 40'' to and from the reversing commutator 28'.

The assembly of code-wheel commutators and brush-retaining plates is secured between a pair of similar curvi-angular flat metal plates 220, somewhat similar in outline to oval plates 200, by two rods 222 passing through aligned holes in opposite apexes of each plate 200 and 220, and threaded at their ends to receive the retaining bolts 224. The bolts 224 urge the plates together, and a plurality of metal sleeves 226, one between each of the brush-retaining plates 200, hold the plates rigidly in spaced relation to rotatably receive the code-wheel commutators. The plates 220 have a central opening to receive the shaft 204 upon which the code wheel commutators are journaled. When the shaft 204 is removed the code wheels are held in the code wheel unit only by the pressure of the resilient commutator brushes and may be removed, inverted, or interchanged.

As an example of one modification of the code wheel set-up it has been suggested that one of the end brush-retaining plates 200 be omitted from the code-wheel unit, and that the wires 40' (or 40'') then be connected fixedly to the ring 208 of commutator contacts on one side of the code wheel $82_1$ (or $82_5$). The fact that the contacts are actually bolts, adapts them readily to the modified function of terminal screws clamping the wires 40' (or 40''). The wires 40' (or 40'') need be long enough to permit only one full revolution of the code wheel $82_1$ (or $82_5$) in either direction, and of course this end code wheel would be rotated no further than the wires would permit. It will readily be appreciated why the illustrated set-up is preferred to the modification here described. The main object of suggesting this modification is to emphasize the fact that; considering the wires 40' (or 40''), as one set of links in the designating interconnections between characters; there is no inherent reason why the incidence of any given link may not be altered (as by moving only one end of said link, while keeping the other end fixed, relative to the rest of the interconnection). In other words, it is desired to indicate that the incidence of an interconnection may be altered by altering the incidence of a link thereof, as well as by bodily moving said link. Movement of the code-wheel commutator $82_1$ (or $82_5$) in the suggested modification would shift only one end of each wire 40' (or 40'') attached thereto; whereas movement of the commutator $82_2$ for example, would bodily shift both ends of the links defined by the commutator wires $88_2$ thereof.

Means are provided to yieldingly resist rotation of the code wheel commutators relative to the assembly of plates 200 which supports them; so that the assembly may be rotated while only certain specified code wheels are held, to cause their advancement relative to the brush retaining plates 200. A shaft 228 (Fig. 11) similar to the rods 222, is bolted between angular apexes of end plates 220. Forked crank arms 230, one for each code wheel, are journaled on the shaft 228, and a roller 232 is pinned in each arm with its periphery adapted to bear upon the notched rim of the code wheel above it. Adjustable springs 234 urge the arms with their rollers against the rims of the code wheels to resist their free relative rotation. The springs are fixed at one end to the free ends of arms 230, and at the other end to a rod 236 parallel to and in front of the shaft 228, and similarly secured to the end plates 220.

The entire code wheel assembly between and including the end plates 220, constitutes a "code-wheel unit," which is journaled for oscillation in the machine. Means (see Figs. 5, 6 and 7) are provided for rocking the code wheel unit about its axis. The end plates 220 each have outwardly extending hubs 250 concentric to the code wheel shaft 204. Each hub 250 is journaled in a bearing 252 in each side walls 102 of the machine, so that the entire code wheel unit is pivotally supported in the machine. A rock shaft 254 is journaled in the side walls 102 parallel to and below the code wheel unit, and a pair of crank arms 256 pinned to the rock shaft is pivotally connected to a pair of connecting rods 258, which in turn are pivoted abaxially to the end plates 220 of the code wheel unit by bolts 260. The shaft 254 extends beyond the side walls 102 and an operating lever 262 extending to the front of the machine, is keyed to one projecting end of the shaft 254. When the operating lever is depressed, the entire code wheel unit is rotated through not less than one twenty-sixth of a revolution. An arm 264 pinned to each projecting end of the shaft 254 is connected by adjustable springs 266, to the side wall 102. The adjustable springs 266 resist depression of the operating lever and restore the unit to normal position upon the release of said lever.

Means are provided for holding selected code wheels against rotation in one direction as the rest of the code wheel unit oscillates, to cause their advancement relative to the unit.

Depressions 267, in the midperiphery of each code-wheel commutator forms its rim into a cog wheel. Ratchet dogs 268, one for each code wheel, are journaled on a shaft 270 (Fig. 8) extending between the side walls 102, and parallel to and behind the code-wheel unit. The active noses of the dogs extend over to contact with the cogged portion of the surface of their respective code wheels, and are beveled to permit free rotation of the code wheels in response to depression of the operating lever 262, while preventing their rotation (relative to the machine as a whole) as the code wheel unit is rotated back by the spring 266. The dogs 268 thereby cause the code-wheel commutators to be advanced relative to their brushes. Adjustable springs 272 connect depending lugs 274 on each of the dogs, to a fixed bar 276 extending between the end walls 102. The springs 272 tend to urge the dogs 268 into active contact with the cogged rims of the code wheels. A plate 277 parallels the bar 276 and extends forward almost into abutment with the lugs 274 of the dogs to limit movement thereof when a code wheel is removed.

Means are provided to hold certain of the dogs 268 out of contact with the code wheels at certain times to permit determined non-synchronous rotation of the code wheel commutators. Adjacent each ratchet dog 268 is a cam-follower dog 278 of somewhat similar shape to the dogs 268, and similarly pivoted on the shaft 270. The follower dog has a cam-roller 280 pivoted to its rounded nose and projecting into contact with its code wheel along the uncogged surface near the edge thereof, so that it is not influenced by the code wheel at each depression 267 in the mid-periphery of the rim. In each code wheel, one of the depressions, 267' extends entirely across the rim of the wheel and therefore into the range of the follower dog 278. Springs 272 are provided for the dogs 278, and are harnessed exactly as for the dogs 268, to urge them toward their respective code-wheels. The characters A, B, C, etc. printed on the code wheels are arbitrarily chosen for convenience in designating starting key conditions and bear no relation to language or code alphabet relations. Index marks 269 are printed on the plates 200 to aid in setting the code wheels to starting position. (See Fig. 5.)

It will be noted that each code-wheel has a ratchet and also a cam for causing and controlling code-wheel commutator advancement. In this respect they differ from the construction of the code wheel in my earlier Patent #1,510,441, aforementioned.

What I believe is a novel type of control mechanism has been provided between the ratchet dogs and the follower dogs to hold the ratchet dogs inactive at all times excepting when one of the rollers 280 rides into a depression 267'. Four parallel bars $284_\alpha$, $284_\beta$, $284_\gamma$, and $284_\Delta$, (subscripts arbitrarily chosen) arranged in an arc concentric to the dog shaft 270, are pivoted at their rounded ends in pairs of aligned holes in the opposite side walls 102 of the machine frame. In each bar 284, Figs. 8 and 9, ten squared holes are formed, one above and directed toward each dog 268 and 278; and any of the forty holes thus provided, are adapted to receive one of a total of preferably eight square-headed dogging pins 286. The bars are recessed rectangularly above each hole to accommodate the heads of pins 286. Each dogging pin is long enough to project appreciably below the bar into one of a series of four notches formed along the back face of each dog 268 and 278 and it is contemplated that each bar 284 will carry two dogging pins; one cooperating with a dog 268 and one with a dog 278. The notches in the dogs 268 and 278 provide teeth adapted respectively to be acted upon by, and to act upon, the dogging pins 286. The active (unbeveled) faces 288, of the teeth in follower dogs 278, face away from the code wheel unit so that the dogging pins bearing thereon will be affected when a roller 280 rides into a depression 267' on any code wheel. The active faces 290, of the teeth in ratchet dogs 268, face toward the code wheel unit so that the dogging pins bearing thereon may hold the ratchet dogs, against the action of springs 272, out of contact with the code wheels. The notches are large enough to permit free play of the dogging pins in a direction away from the active faces 288 and 290. When the roller 280 rides up out of notch 267', it raises the cam-follower dog 278. The active face 288 of one of the notches in the follower dog, moves the dogging pin cooperating therewith, causing the bar 284 in which it is carried to rock back with its second dogging pin against the active face 290 of one of the notches in the ratchet dog 268, thereby moving the ratchet dog, against the action of its spring 272, out of contact with the cogged surface of its code wheel. Each time one of the code wheels has rotated a full revolution to bring its notch 267' under the roller 280, the associated code wheel of next lower speed is moved ahead one notch.

The projecting tips of the dogging pins 286 are cut away from one side to leave an active central dogging face. When the pin is placed with its dogging face forward toward the code wheels, it is operative upon the teeth in the cam follower dog 278, and when turned through 180° to place its dogging face backward, it is operative upon the ratchet dog 268.

The squared heads of the pins 286 (Fig. 9) are offset (longitudinally of the bars 284) relative to the main axis of the pins, to permit close enough juxtaposition of the pins. Between each pair of holes in each bar 284 is a threaded hole adapted to receive a cap screw 292 for clamping any pin, or pair of pins, in place.

Due to the involved character of the structure, Fig. 8 has been made fragmentary to completely illustrate only one or two control trains through the bars 284. It is feasible however to completely describe the operation with one sample arrangement of the dogging pins 286 in the bars 284 by the use of subscripts. Subscripts 1 to 5 after any reference character will designate juxtaposition to code wheels $82_1$ to $82_5$; subscripts $\alpha, \beta, \gamma,$ and $\Delta$, will designate juxtaposition to bars $284_\alpha$ to $284_\Delta$; and subscripts R or F will designate juxtaposition respectively to ratchet dogs 268 or to follower dogs 278. Thus, for example, $286_{R\gamma2}$ designates a dogging pin in bar $284_\gamma$ projecting into a notch in ratchet dog $268_2$ bearing one code wheel $82_2$. As a sample arrangement, take pins $286_{F\beta1}$, $286_{R\beta2}$, $286_{F\gamma2}$, $286_{R\gamma3}$, $286_{F\Delta3}$, $286_{R\Delta5}$, $286_{F\alpha5}$ and $286_{R\alpha4}$. These dogging pin positions have been tabulated as follows:

| Code Wheel | $82_1$ | $82_2$ | $82_3$ | $82_4$ | $82_5$ |
|---|---|---|---|---|---|
| $284_\alpha$ | | | | 286R | 286F |
| $284_\beta$ | 286F | 286R | | | |
| $284_\gamma$ | | 286F | 286R | | |
| $284_\Delta$ | | | 286F | | 286R |

Dogging Pin Bar

Referring to the above table it will be noted that the ratchet dog $268_1$ bearing on code wheel $82_1$ has no dogging pin 268 cooperating with it to hold it out of contact with its code wheel. This means that with the selected dogging pin arrangement, code-changing commutator wheel $82_1$ will be continuously rotated one step each time the code wheel unit rocks. Once each revolution, the notch $267_1'$ will roll under the cam follower dog $278_1$, causing the dogging pin $286_{F\beta1}$ (see table) in contact therewith to release its bar $284_5$ with dogging pin $286_{R52}$ so that a ratchet dog $268_2$ will be allowed to contact code wheel $82_2$ to advance it one notch or one twenty-sixth of a revolution. When code wheel $82_2$ has rotated this way, through a complete revolution, it causes wheel $82_3$ (see table) to advance one step. After each complete revolution of wheel $82_3$ this way, wheel $82_5$ is advanced, and so on, automatically in progressive non-recurrent succession, until a number of changes of code has been accomplished which is measured by the number of letters in the alphabet raised to the power of the number of code wheels provided.

In this machine, with the described arrangement of pins 286, the number of absolutely automatically controlled code changes involving no shift of key or starting conditions nor adjustment of any kind is twenty-six raised to the fifth power $(26^5)$ or $11.9 \times 10^6$ independent and absolutely automatically controlled changes of code relation, lacking any regular recurrence, and based upon a purely mechanical plan having no relation to which letters are coded.

Commercially, the machine is supplied with more than eight dogging pins in order that certain of the code wheels may be held inoperative if desired by the users. This opens a whole new range of selective key conditions, for if a third dogging pin 286 is inserted in any one bar 284, in line with a second cam follower dog, obviously one of the code wheels will be controlled, not by a single cam follower dog, but by two said dogs, and will be advanced but very infrequently. Similarly, by logical extension, any one or more code wheels may control or be controlled by any one or more other code wheels; or by using enough dogging pins, may be prevented from advancing; or by using less than two dogging pins in one bar, certain wheels may be moved continuously. In short, the bars 284 and movable dogging pins 286 provide adjustments permitting practically every conceivable arrangement and relation of code wheel drives. While, in preferred form, my invention specifies the aforedescribed arrangement using eight dogging pins, the other possible combinations of code wheel movement might be tabulated, and each will be found to produce a different specific coding system. It would be inexpedient to describe each of these systems in detail, and I have chosen the more concise exposition; viz. to explain how these systems are attained. The machine of my invention may in fact, be considered a basic formula for deriving new coding systems; the particular solutions of the formula being accomplished by substituting dogging pins 286 in the various holes provided in the bars 284.

In addition to those arrangements of dogging pins which produce new coding systems, there are of course, many different ways in which each system may be applied to the five code wheels. In fact, with the single system described as preferred, and using two dogging pins in each bar 284, there are 120* possible arrangements of these pairs of dogging pins. This figure will be used in the following sample calculation of the number of changes of key conditions provided by my machine. The number of these possible changes and the ease with which they may be made practically insures the ability to maintain secrecy of code even though the construction and manner of operation of this type of coding machine be common knowledge.

The adjustability of these dogging pins provides selective means for altering the normal movement of any, or any combination, of the code wheels. Thus the relative speeds may be altered at will, and the speed of any wheel may be varied from a stand-still to maximum speed.

Aside from the aforedescribed means for driving and adjusting the code wheels, any one of them may be rotated by hand (due to the fact that the ratchet mechanisms are positive in only one direction), and thus the phase relation of the code wheels may be adjusted, and the wheels may be reset to any starting position.

There are $26^5$ different possible starting positions of rotation for the combined five code wheels. In addition to the 120 dogging pin arrangements there are 120* possible relative arrangements of the five interchangeable code wheels in the machine (i. e. positions of each of the five groups of links relative to the designating interconnections); and for each of these 120 positional arrangements there are $2^5$ possible arrangements between normal and invert positions of the five code wheels. So far we have $120 \times 26^5 \times 120 \times 2^5$, or over eight trillion possible changes. The arbitrary designation of code and decode positions may be interchanged, thus doubling the possible number of changes to $120 \times 26^5 \times 120 \times 2^5 \times 2$. There are twenty-six different key positions of the reversing commutator, making $120 \times 26^5 \times 120 \times 2^5 \times 2 \times 26$ possible changes, or a total of 284 trillion, $(2.84 \times 10^{14})$ changes securable by simple adjustment. In addition, there are a practically infinite number of changes of wiring possible in the combination of six commutators (five code-wheels, and one reversing commutator). It is intended however, that changes of wiring be resorted to only in unusual circumstances, for the more simple adjustments provided in the structure of the machine, should be ample for all ordinary purposes.

---

*This figure is most easily understood by considering that the dogging pins may control the relative speed of five different code wheels in different combinations. See Langie—"Cryptography" (Constable and Co. Ltd., London, publishers) page 156 for possible arrangements of five elements.

A pair of corresponding machines must have their six commutators respectively identically wired and positioned in order for one to decode a message coded on the other. Assuming two machines are thus identically wired, and have their reversing commutators identically positioned, then a sample "final key" condition, known to both correspondents and serving as the starting position for coding or decoding, might be:

Order of code wheels left to right: 5, 2, 1, 3, 4; code wheel #1 inverted, all others normal. Starting positions of code wheels left to right: Y, B, A, C, X. Dog positions: as per above table. Reversing lever in "code position" for coding; "decode" for decoding.

The machines must be set to these "final key" conditions at each starting position of coding and of decoding; and if any "key condition" whatsoever, on either machine is changed, a corresponding change must also be made in the other machine. For convenience in setting the code wheels to starting position, the aligned index marks 269 have been printed on the top edge of each oval plate 200.

The master switch 294—296, heretofore referred to, consists of a platinum contact 294 (Fig. 7) connected by the wire 171 to the negative terminal 148 of the dry cell battery and supported in an insulating clamp 298 bolted to the rock-shaft arm 264. An upstanding contact 296 is bolted against an insulating plate and to the side wall 102 in the path of the contact 294, and is connected by the wire 170 to the negative bulb terminal plate 138. This switch is closed only when the main operating lever 262 is fully depressed, allowing the machine to indicate only then. Since the code wheel advance is automatically accomplished upon release of the lever 262, the operation of this multi-code machine is not dependent upon the operator's memory to advance the code wheels.

The five-wheel indicating code machine is of comparatively small size and light weight, and may be carried about in a packing case in much the same way as a portable typewriter would be. A pair of horizontal lugs 300 project inwardly from the back of the bottom of the base frame to form feet, and are each provided with rubber seating pads 302. A vertical hole centrally through each lug extends up through the top of the base frame 100 to receive the thumb-screws 304 for clamping the machine within a portable case, (not shown). It is intended that the case be of closed handbag type and be provided with a lock, so that the code wheels may not be open to general inspection when the machine is not in use.

The two portable machines of my invention, which I have so far described may be used complementarily by a single pair of correspondents, or either may be used with the power-driven recording machine next to be described. In other words, by proper attention to the "key conditions" of the machines, either multiple-commutator machine might be used to decode a message coded on the elemental machine or vice versa; and similarly the two types of multiple commutator machines might be used complementarily. Thus, for example, an excessive number of dogging pins 286 might be inserted into the bars 284 in the multi-code machine so that only one code-wheel would be rotated. This multi-code machine would then operate normally on the simple system generally used in operating the midget coder. Then by proper selection of the wiring and starting positions in the two machines, they could be used complementarily.

*Auto-multi-codewriter (five-wheel recording code machine)*

In the final form of my invention I have retained the advantageous features of the aforedescribed multi-coder, some in considerably refined form, and to them I have added a number of improvements. Throughout, however, I have retained the essential features of the simpler device. The description which is to follow assumes a knowledge of these essential features as described. I have, throughout the design of this final form of my invention, striven to provide a machine which does its own thinking (as by mechanical and electrical auto-controlling interconnections) so that errors introduced through the "personal equation" are reduced to a minimum.

In broad terms, the five-wheel recording code machine would correspond to a five-wheel indicating code machine arranged for power operation, and having its electric bulbs displaced by novel printing mechanism. Features of novelty relating to both of these generally defined modifications of the previous device, will be explained, both as inherent in the mechanism and arrangement, and as auxiliary thereto.

A base-frame casting 400, of generally rectangular plan, has depending foot lugs 402, one at each corner, an upwardly-directed front keyboard base 406, and perimetral walls 408 having a flat upper seating face adapted to receive an encasing cover 412.

The cover 412 is hinged at 414 to the back of the base frame, and has a pair of sockets formed in its front rim to engage with locking bolts 416. The locking bolts are housed in lugs 418 upstanding from the base frame and are each slotted at their inner ends to form yokes for the upper ends of actuating cranks 420 attached by pivot pins 422. The actuating cranks are pinned to a lateral shaft 424 (Fig. 13) journaled in the base frame, and actuated by an appropriate "Yale" or other standard lock 426, operated by a key 428. When the cover is locked the machine cannot be operated and the secret code-wheel commutator wiring is hidden.

The machine is provided with a typewriter-like keyboard. Rising from the front part of the base-frame 400 is a keyboard housing comprising a generally dome-shaped casting 430 (Fig. 16) having side walls 432, flanged at their bases to seat upon the side walls of the base frame, and attached thereto by screws 434. The operating keys are pivotally supported by a key-bearing shaft 436 supported at its ends by aligned holes in opposite side walls 432.

Journaled on the shaft 436, are a plurality of separate typewriter-like switch-actuating keys 438 (Figs. 11, 12, 14 and 15) analogous to the push buttons 20 and 120 respectively of the two machines aforedescribed, and each distinguished by a different language or code character embossed on the finger tab thereof, and hereinafter differentiated by these characters as subscripts; e. g. 438a, 438b, etc. Each key is a vertical strip journaled at its rear end on the shaft 436 with its axis horizontal. An upstanding ear at its front end carries the finger tab. A depending ear near its front, (Fig. 15), terminates in a rearwardly extending horizontally flattened hook 442, to the top of which is fixed first an insulating tab 444, and then one end of a resilient flat brass conductor 446. The other end of each conductor 446 is fixed to a single insulating plate 448. Push button contact tabs 450 and 452, one on the conductor 446 and one beneath it on the plate 448, make each key 438 control a push-button switch 450—452. The contact tab 452 is a bolt extending through the insulating plate, and constitutes directly one terminal of the push-button switch. The other switch terminal 450' is formed by the bolt which secures the resilient conductor 446 to the plate 448. The washer 453 about each bolt 450' is merely a spacer between the members 446 and 448.

The contacts 450—452 are held normally separated and the keys are held in raised position by adjustable springs 454, (Fig. 11). The springs have their lower ends hooked through holes provided for them in the keys, and at their upper ends are held by long threaded screw hooks 455 slidable through holes provided for them in the top of housing 430. The effective length of the screw hooks, and therefore the spring tension, may be adjusted by the thumb nuts 457 for each screw hook. The thumb nuts abut against the top of housing 430. This type of spring adjustment using a long adjustable bolt-hook at one spring attachment has been standardized throughout my machine, and will hereinafter be referred to simply as an adjustable spring.

Upward movement of the keys is limited by depending flanges 456 and 458 extending from one side to the other of the housing 430, Fig. 16.

Means are provided for adjusting the normal distance between contacts 450 and 452. The insulating plate 448 supporting the contacts 452, is held at each end by a pivoted arm 458' (Fig. 16). The arms 458' are pivoted at 460 to side walls 102' rising from the base frame 400 immediately behind the walls 432 of keyboard housing 430. The forwardly extending portion of arms 458' which support the plate 448, are provided with arcuate slots 462. A screw 464 (Figs. 13 and 14) in each lug 418 upstanding from the front part of the base frame, has its shank extending through the arcuate slot 462 so that its head is adapted to clamp the arm 458' in adjusted position to adjust the height of contacts 452.

A spacer bar 459 is provided and positioned as in an ordinary typewriter. It is carried at the end of a pair of arms 461, (Fig. 16) one at either side of the housing 430 just inside of the walls 432 thereof. The arms 461 are fixed to a shaft 463 journaled in the walls 432 parallel to and behind the main key-bearing shaft 436. No separate code connection is employed for the spacer. Instead, a hook 465 is screwed to the spacer bar with its end hooked over key 438z (Fig. 12), so that the code of the infrequently used letter "Z" is charged with designating the spaces between words; it being inadvisable to space the code letters into blocks equal in length to the words coded, for this gives a clew to guessing certain words for deciphering the code. It may be found convenient to provide a plurality of screw holes in the hook 465 and bar 459 so that the hook may be attached in different positions to engage different keys.

Whereas, in the machines aforedescribed, closing of a push button switch actuated an indicating light; in this recording machine, type-writer mechanism is provided instead, and will now be described. The typewriter sub-frame is an annular hollow metal casting 474, having four apertured supporting ears 476 projecting radially from its lower circumferential surface. These ears are secured by bolts to four vertical posts 478 rising from the base frame 400 at its rear portion. An L-sectioned metal ring 480, concentric to the casting 474, rests with its rim upon the casting, and carries the circle of two alphabets of type bars.

Each type bar 482 or 483 is pivoted in a yoked lug 484 which is bolted to the plate 480. The type bars are arranged in two aligned eccentric semi-circles of equal diameter so that any two type bars 482 from the language alphabet semi-circle and 483 from the code alphabet semi-circle, may be operated simultaneously to print their letters one directly above the other on a paper tape 700. The terms language alphabet semi-circle and code alphabet semi-circle are not mutually exclusive. It will be shown that (as in the shift from coding to decoding operation) either may print either code or language characters. The type bars are of bell-crank-lever shape, and each has a hole formed in its outer end to receive one hooked end of one of a plurality of stiff vertical actuating wires 486. When any wire 486 is pushed up, the type bar attached thereto is actuated.

Electromagnets are provided for pushing the type-lever actuating wires 486 up, and weight is utilized to return their type levers to inoperative position. The annular casting 474 has a ring of holes in its top surface to receive a plurality of cylindrical armatures 488, one for each type-bar-actuating wire 486. Each armature has a transverse hole at its top to receive the lower hook end of the wire 486, and has its lower end projecting considerably below the annular casting 474 and provided with a heavy brass collar 490. The weight of the bar and its collar combined, are sufficient to normally hold the type bars up in inoperative position. A pair of semicircular felt-lined buffer bars 492 limit upward movement of the type bars, and are rigidly supported by vertical posts 494 rising from and bolted to the top surface of the casting 474.

Electro-magnet coils are provided for impelling the type levers. Each armature 488 is loosely surrounded by a magnet coil 496 for the language alphabet, or 497 for the code alphabet, retained within the hollow casting 474 by a body of solidified sealing wax 498. (See Fig. 11.) When any coil is energized the armature is pulled up suddenly, causing the corresponding type bar to be actuated. The inertia of the parts provides the light hammer-like blow desirable for clear printing. The major portion of each armature 488 is iron or soft steel, but coupled to the top of the iron portion is a brass or other non-magnet portion 488', which extends down about as far as the middle of its coil 496 or 497 when the keys are in inoperative position. The purpose of this is to increase the magnet efficiency, since the pull on an iron core is greater when the core is half-way out of the coil than when it extends the full length thereof.

The wiring connections between the two (language and code) sets of type actuating magnets and the push button switches controlling them will be described separately in order before the detailed description of type-printer auxiliaries is gone into.

The magnet coil terminals are all carried by two somewhat similar centrally apertured insulating plates 499 and 500 (Fig. 11) positioned horizontally one above the other, and bolted to an inwardly extending bottom flange 502 of the casting 474. Integral spacer lugs 504 on the plate 500 hold the two plates separated. One terminal of each language-alphabet coil 496 is connected to a single metal contact plate 506 in the upper plate 499 by short leads 507, (Figs. 10 and 11), and the other terminal thereof is connected by short leads 509 to a semicircle of contacts 508 in the lower plate 500. The terminals 508 (of the language alphabet coils only), are connected each by a separate wire 510 through a wire 511, Fig. 10, directly to one terminal 452 of the push button switch. The contact ring 506, common to the other lead of the coils, is connected by a wire 512 (through power magnets 548, normally closed switch 556 and fuse block 558, not affecting the present consideration,) directly to one lead 514 of a standard electric light plug 515 or other source of current for the entire machine. The other lead 516, of the source of current is connected (through the fuse block 558, switch 556, and circuit breaker 294'—296' not affecting the present consideration,) directly to the other terminal 450' of the push-button switch, thus completing the circuit through the language alphabet type-actuating coils.

The character on every type bar of the language semi-circle 482 corresponds identically to the character labeled on the key 438 electrically connected therewith; so that whenever a key 438 is depressed, its corresponding type in the language alphabet semicircle 482 will print just as in a non-cryptographic electric typewriter. The electrical connections for operating the code alphabet semi-circle 483 of type bars to simultaneously print the code characters, will next be described.

One terminal of each code alphabet coil 497 (Figs. 10 and 11) is connected by a short lead 517 to the common contact ring 506; which, as aforedescribed, is connected (through the source of current) to one terminal 450' of the push button switches. The leads 519 from the other terminal of each coil 497 do not lead directly to the other terminal of a definite and particular switch, but are connected to their switches through a series of commutators next to be described. The leads 519 are connected to a semi-circle of separate contacts 521 in the plate 500.

Each contact 521 is connected by a short wire directly to the inner ring of reversing commutator brushes 166 now to be described.

Axially beneath the annular coil-housing casting 474, is an opening in the base frame 400 which is identical in all respects both structurally and functionally to the circular opening in the base frame of the portable multi-coder aforedescribed. The opening is similarly closed by a commutator-brush-retaining plate 158 superposed above a rotatable reversing commutator 28'. These parts are all identical to the corresponding parts of the portable multi-coder and therefore will be referred to by the same reference characters heretofore used in defining said parts, and will not be described again.

A feature of the reversing commutator not previously described in detail has been clearly illustrated in Fig. 13 and will now be described as applicable to both multi-code machines. The rim 160, upon which the commutator-brush-retaining plate 158 seats, is divided off into twenty-six equal spaces each designated by one language character A, B, C ... Y etc. and corresponding to one set of commutator contacts. The plate 158 above it, has a radially pointed notch 523 through which the characters are visible one at a time as the commutator is rotated to change its initial or "key" position. The key position can be altered by sight and without the necessity for guess-work and trial, by this means. In Fig. 13 positions of the (commutator-brush-retaining) plate 158 have been broken away to disclose the rim 160 and commutator 28′ therebeneath.

A cylindrical guard 525 (Fig. 11) encompasses most of the space between the reversing-commutator brush-retaining plate and the lower contact plate 500, to protect the wires between them from the ring of moving magnet armatures. An annular flange at the bottom of the guard is bolted against spacer lugs 527 and to the periphery of the brush-retaining plate 158.

Reverting to the electrical connection of the code-alphabet magnets 497 through the reversing commutator (Fig. 10): it will be recalled that one lead from each code magnet 497 has been traced to the contact ring 506 which connects it through the source of current to one contact bus bar 450′ of each pushbutton switch 450—452 operated by the keys 438; and that the other contacts 452 of each switch are connected by a wire 511 to the outer ring of reversing commutator-brushes 156. It has also been recited that the inner ring of reversing commutator-brushes 166 is connected by wires 519 to the other lead from each code-alphabet magnet 497. In order to complete a circuit through the coils 497 when a key 438 is depressed, it is necessary merely to electrically connect the brushes 166 of the inner ring to the brushes 156 of the outer ring by means of the reversing commutator 28′; but just as in the aforedescribed five-wheel-indicating code machine, the commutator circuits have code-changing commutator wheels 82 interposed in them. The electrical details in both cases are identical. Wires 40″ and 40″ lead effectively from contacts 176 and 178′ of the reversing commutator to opposite sides of the code wheel unit which continually changes the circuits. (Fig. 10 actually represents wires 40′ connected to contacts 176′ and 178 instead of to contacts 176 and 178′; but since the contacts are cross-connected by wires 36′, the effect is identical.)

In operation, each time a key 438 is depressed, the current flowing through its tortuous circuit including the several commutators, energizes one of the coils 497 which causes a type bar from the code alphabet semicircle to print upon the paper tape 700. This action occurs simultaneously with the aforedescribed action of the type bar from the language alphabet semicircle, so that the code and language characters are printed adjacent to each other on the tape, and may be compared, as shown at the left of Fig. 22. To change from coding to decoding operation it is merely necessary to shift the reversing lever 186 as in the indicating code machine and to reset to the initial "key conditions".

It will be noted that the circuits which operate the type levers 482, of the language alphabet semicircle, are relatively short and direct with few impermanent contacts, as compared to the tortuous circuits which operate the type levers 483 of the code alphabet semicircle. The electrical resistances of the circuits are therefore dissimilar, and since it is desired to operate them all from a single current source, means are provided to balance the system so that the type levers 483 will be impelled by the same amount of force as type levers 482. To this end, the stiff wires 486 attaching the type levers 482 of the language semi-circle to their armatures 488 are made slightly shorter than those connecting the type levers 483 to the code semicircle; with the result that the former armatures are raised slightly above their central position of maximum efficiency in their coils 496, and are therefore moved without excessive force by the higher voltage of their low resistance circuits.

It will be recalled that in coding a language message, the spacer bar 459 was permitted to actuate the key 438z. In decoding then, a "Z" would print between each word of the decoded message. To obviate any possible confusion from this source, means have been provided for locking the type lever 482z of the code alphabet semicircle when decoding, to space the decoded words exactly as they were spaced in the original message. A lever 529 (Figs. 11 and 21) is pivoted by a bolting pin 531 to the rear wall 540 of a box 534 rising from the base frame 400, and has its top broadened hook-end extending over the collar 490z of the armature 488z which actuates the type bar 482z of the code alphabet semicircle. (It should be noted, to avoid misunderstanding, that when decoding, the "language alphabet semicircle" copies, not the language message, but the code message, just as it is struck on the keys of the machine by an operator wishing to interpret the code message; and that the "code alphabet semicircle" then simultaneously prints the language message.) The lever 529 holds the armature 488z and causes a space to be left when the code (in this case "decode") equivalent of language letter "Z" is struck. The collar 490z is adjustable longitudinally of the armature, and by means of a set screw 533, it may be clamped in raised position to incapacitate the "Z" type bar when coding as well as decording, or may be lowered to totally inoperative position. (See Fig. 21.)

The lever 529 is connected operatively with the reversing lever 186, so that the shift from code to decode position of the reversing lever causes the type bar 482z to be incapacitated. The linkage is diagrammed in Fig. 21; the lever 186 being distorted slightly therein to clarify the showing. Pivoted to the reversing lever 186 by a bolt 535, is a long rod 537 extending transversely of the machine and pivotally attached by a bolt 539 to the depending arm of lever 529, which is of bell-crank shape. When the reversing lever is moved to the left into "decode" position, it causes the lever 529 to abut against the collar 490z on armature 488z.

It is anticipated that other characters than "Z" might be used as the spacer, and provision has been made for screwing the hook 465 to different parts of the spacer bar 459 to engage a key other than key 438z. Two split collars 561, one of which is shown in Fig. 21, are furnished with each machine, and if desired one may be clamped about the base of any armature 488 of either the code or language semi-circle, to incapacitate the type bar connected thereto. The split collar 561 abuts against the bottom of the coil when energy is applied to the coil, and therefore the armature is held against movement. When the split collar is used on the language type bar 482z for example, the language message reads normally with a blank space wherever a "Z" would otherwise occur. The nature of the message will invariably indicate when the infrequently used letter "Z" should be actually read into the message.

The code wheel unit is supported, as before, by side walls 102' modified but very slightly from the side walls 102, and bolted to the base frame 400 just behind the keyboard housing 430. The code wheel unit, inclusive of the entire dog action for advancing the code wheel commutators, is exactly the same as in the five-wheel indicating code machines, but the linkage and mechanism for rocking the code wheel unit is modified to replace manual operation by power operation. A lug 518 (Figs. 12 and 14), is attached acentrically to each end plate 220 of the code wheel unit by the bolts 224 which assemble the unit, said bolts engaging laterally directed base extensions 519 of the lugs. The lugs 518 extend outward to the sides of the machine, and each has a connecting rod 520 pivoted at one end to the outer end thereof by a bolt 522. The other ends of the connecting rods 520 are pivoted to the upper extremities of substantially T-shaped rock levers 524 by bolts 526. The rock levers in turn, are pivoted to the forward outwardly flanged extensions 528 of each side wall 102' by pivot bolts 530. The long arm of each T-shaped lever 524 extends horizontally back along either side of the machine and has a counterweight 532 bolted to its end to urge the code wheel unit to normal position. The axes of the bolts 526 and 530 are relatively close together to provide a considerable leverage for the counterweights. Rubber-topped bumpers 532' are screwed into the base frame beneath each counterweight.

Means are provided for rocking the code wheel unit against the action of the counterweights. A metal box 534 bolted to the bottom of the base frame 400, beneath the code wheel unit, has eight holes formed horizontally through its two spaced parallel front walls 536 and 538, and eight holes aligned therewith in its rear wall 540, to slidably receive magnet armatures 542. (Figs. 11 and 13.) Each magnet armature is slotted longitudinally at its front end to receive pusher bars 544 pinned thereto, and all extending forward to a single transverse pusher rod 546. Each pusher bar has a hole formed transversely in its front end to rotatably receive the rod 546. The ends of the rod 546 are bolted to the lower extremities of the T-shaped rocking levers 524, so that when the armatures 542 are pulled back, the code wheel unit is rocked against the action of the counterweights. Magnet coils 548 loosely surround each armature, and are retained between the walls 538 and 540 within the box 534 by a bed of sealing wax 550 (Fig. 11). Bumpers 551 (Figs. 13 and 14) similar to the bumpers 532', are screwed into the front wall 536 one at each side of the box 534 and behind the depending leg of the T-shaped rocking levers 524 to stop their upward movement.

Wires connect the coils 548 in series, and the series of coils is connected in series with the type-actuating magnets (see Fig. 10); so that when any type is actuated, the power magnets 548 are also operated to advance the code wheels. The wire 512 from the contact ring 506 common to all the type-actuating coils, connects to one terminal of the series of magnets 548; and a wire 554 leads from the other terminal thereof, through the switch 556 and fuse 558 to the lead 514 of the source of current.

In operation, when any key 438 is depressed, the language type lever 482 corresponding thereto is actuated, a type lever 483 selected by the coding feature of the machine is simultaneously actuated, and at the same time the code wheel unit is rocked forward so that upon its release the counterweights will advance one or more code wheels to alter the code sequence. Attention is directed to the compact flat set-up secured by the use of a plurality of power magnets 548.

The switch 556 is placed in series with the source of current to render the entire machine inoperative when not in use. The fuses 558, in series with the switch, are an added protective feature. Means, analogous to the master switch 294—296 of the aforedescribed machine, and distinct from the push button switches 450—452, are provided for making and breaking the entire series circuit at each operation of the machine. Connected in series with the lead 516 of the source of current is a switch 560—562 (Fig. 15), the platinum contact 560 of which is connected to the wire 516, and the contact 562 of which is connected by a wire 563 to the push button bus-bar 450'. The contacts 560 and 562 are each carried in separate cap nuts 564 retained in vertical brackets 566 and 568 by terminal screws 570 passing loosely through holes in the brackets and separated therefrom by insulating washers 572. The screw heads and cap nuts are also separated from the brackets by insulating washers. The bracket 566, carrying contact 560 is secured by a bolt 576 to the frontal side of a bracket 578 bolted to the side wall 432 of the keyboard housing (Fig. 16). The bracket 578 has a horizontal shelf 580 and a parallel roof 582 integral therewith. The bracket 568, (Fig. 15), carrying contact 562, is L-shaped and has its horizontal arm 584 slidably retained under the roof 582 by a bar 586 independently slidable between the bottom of the arm 584 and the top of shelf 580. A hook 587 on the end of bar 586 engages the end of arm 584 to hold the contact 562 away from contact 560, and a relatively strong adjustable spring 588 is connected between the hook ended bar 586 and the side wall 102', for this purpose. A stop 590, clamped to a flange of the keyboard housing by a bolt 591, limits movement of the bracket 568 under influence of spring 588. A slot 593 in the stop plate permits adjustment of its position. An adjustable relatively weak spring 592 between the brackets 566 and 568 serves to move the contacts together when the spring 588 is rendered ineffective. In order that the breaker contacts 560—562 may close after any of the push-button contacts 450—452 close, means are provided for moving the hook ended bar 586 against the action of its spring 588. A rod 594 (Figs. 15 and 16) extending across the machine underneath and against the keys 438, is bolted at its ends to the front ends of levers 596, and 598. Each lever has a collar 600 at its rear end, which is pinned to a shaft 602 journaled at its ends in the side walls 432 of the keyboard housing. The lever 596 on one side of the machine is of bell-crank shape with a vertical arm 604 rising above its fulcrum shaft 602. Pivoted to the top of the arm 604, but normally held immovable with respect thereto, is a trigger 606 having a horizontal finger 608 projecting forward into abutting relation with the hook-ended contact-separating bar 586. When any key 438 is depressed, the bell-crank lever 596 is rocked, causing the finger 608 to move bar 586 against the action of its spring 588, and thus allowing the breaker contacts 560—562 to contact slightly after the push button contacts 450—452. The machine does not start to operate until the breaker-points 560—562 contact.

Means are provided for separating the breaker points as soon as the electro-magnets of the machine have functioned, and without regard to the position of the operating keys 438. The trigger 606 is notched at its front upper corner to form the vertical shoulder 610 adapted to abut against the end of bar 586, and the horizontal ledge 612 adapted to abut against the bottom of the bar 586. An adjustable spring 614, connecting a depending vertical finger 616 of the pivoted trigger, to the bell-crank on which it is pivoted, urges the ledge 612 to its limiting position up against the bar 586. When the trigger is rotated against the action of its spring 614 the vertical shoulder 610 is drawn below the level of the abutting bar 586, allowing the bar to snap back and separate the contacts. A vertical finger 618 rises from the trigger into the path of a tripper dog 620 on the linkage which rocks the code-wheel unit. The tripper dog is bolted to connecting rod 520 (Fig. 14) in position to actuate the trigger when the code wheel unit is rocked farthest from normal position; i. e. with its counter weights 532 up. Actuation of the trigger 606 opens the switch 560—562.

An electric condenser 622 (Fig. 10), of standard construction, is connected across the breaker switch 560—562 to reduce arcing thereof. The condenser is strapped to a bracket 624 rising from the rear of base frame at one side thereof. A similar bracket 626 at the other side of the base frame carries the standard fuse block 558 in which the fuses are retained.

The paper tape 700 on which the code and language messages are printed one above the other, is fed from a roll 700' supported in the transverse diametral plane of the annular type housing 474 (Fig. 17). The housing is undercut on one side to accommodate the roll; this being permitted by the absence of type electro-magnets in this space between the two type semicircles. The roll is journaled on a removable pin 702 connecting the upper extremities of a pair of spaced brackets 704, one on either side of the roll. The brackets are connected at a point just beyond the circumference of the roll by a second pin 706, and a third pin 708 pivots them at their lower extremities within a yoke 710 bolted to a pedestal 712 rising from the base frame 400. When the cover 412 of the machine is removed the roll-retaining brackets may be swung out until the heel portion of the brackets 704 rests upon the rim of the base frame. The tape 700 is led up from the roll and over a horizontal metal guide strip 714 bolted to the top of the type-supporting ring 480. The plate 714 guides the tape under the centers of the two type semicircles.

Means are provided for feeding the tape and for splitting it into its code and language components. A pair of upstanding ears 716 on opposite sides of the guide strip 714 are connected by a pivot pin 718, having a yoked lever 720 pivoted thereon. The yoked end 722, of lever 720, extends horizontally above and beyond the guide strip and carries a stepped feed roller 724 (Figs. 12, 17 and 18), pinned to a shaft 726 journaled therein. The bottom of the roller is level with the tape 700, and the step 728 of changing diameter occurs sharply in line with the center of the tape. A spring 730 (Fig. 17), connects the outer end of lever 720, through an opening provided therefor in the top surface of sub-frame 474, to a radial bracket 732 bolted to the lower rim of the sub-frame. The spring urges roller 724 upon the paper tape and against a complementary stepped shearing feed roller 734. The roller 734 is pinned to a long drive shaft 736 which is journaled at one end in a pair of ears 738 depending from each side of the guide strip 714 beyond the end thereof. The other end of drive shaft 736 is journaled in a vertical bracket 740 bolted to the top of side wall 102' of the machine. Enmeshed gears 742 and 744 are pinned to the ends of the roller shafts 726 and 736. A hand wheel 746 on the end of the drive shaft 736 provides for manual advance of the tape. The rollers not only advance the tape, but due to their stepped contour, they split it to assure separation of the language record from the code message; both of which are printed, in adjacency for checking, on the same tape.

Means are provided for rotating the drive shaft 736 step-by-step to advance the tape one letter at a time. A ratchet wheel 748 (Figs. 18, 19 and 20) is bolted to a disk 750 having a collar 752 pinned to the drive shaft 736 near its forward end. A rocking lever 754 is journaled on collar 752 and pivotally carries a ratchet dog 756 urged into operative relation to the ratchet wheel 748 by a spring 758. The rocking lever is actuated by a vertical arm 760 bolted to a peripheral lug 762 on the side of one end plate 220 of the code wheel unit, so that normally, each time the code wheel unit rocks, the ratchet wheel 748 is advanced one tooth. The ends of the vertical arm 760 are a loose fit on the bolting pins which pivot it. Since its movement is slight, the loose pins allow sufficient play to compensate for its slight arcuate deviation from straight line motion. An idler dog 766 pivoted to the bearing bracket 740 and urged toward the ratchet by a spring 768, insures against retrogression of the ratchet wheel.

Means are provided for advancing the tape two letter spaces at certain times to separate the code letters into groups. An integral bracket 770 projects from the bearing bracket 740, and pivotally carries the cam-follower lever 772 having its end bearing on disk 750 and urged toward said disk by a spring 774. The rear or top face of the cam-follower lever is itself a cam; being provided with a hump 776 in the way of a pin 778 projecting from the nose of the ratchet dog 756. Normally the ratchet dog is dragged back over two teeth of the ratchet wheel 748, but is temporarily held clear of the ratchet teeth by the hump 776 so that it only bites one tooth on its return stroke. In order that it may bite the two teeth on every fifth return stroke, to space the code into groups of five characters, the disk 750 is provided with a depression 780 opposite every sixth ratchet tooth. Since the ratchet is bolted to the disk, it rotates with it, and when a depression 780 rides under the cam-follower lever 772, the hump 776 is depressed below the path of pin 778, and the ratchet advances two spaces.

When a message is being decoded it is desirable to alter the regular five-letter spacing of the message into normal word spacing. Two means are provided for this purpose. The first consists of the aforedescribed (see Fig. 21) means for holding the type lever 482z inoperative to leave a blank space each time the code of "Z" is decoded. The second consists of means for incapacitating the five-letter spacer. Pivoted to the bracket 740 is a lever 782 having its operative end 784 protruding under the arm 786 of cam-follower lever 772 so that when the lever 782 is rocked it will abut against the cam-follower lever and prevent its recession into the depressions 780. The lever 782 is actuated by a connecting rod 787 pivoted at its lower end to a crank 788 (Fig. 21). The crank 788 is pinned to a longitudinal shaft 790 journaled in spaced lugs 792 (Fig. 13) on the sides of the power coil housing box 534. The shaft 790 is connected to the reversing lever 186 by the connecting rod 537, which actuates the "Z" type clamping lever 529 aforedescribed. The rod 537 (Fig. 21) is extended to the side of the machine and is pivoted at its end to a depending crank 794 on the shaft 790.

The tape is held tense by a roller 796 (Figs. 17, 12 and 14) at the receiving end of the guide strip 714. The roller is journaled in a yoked lever 797 similar to lever 720 and similarly pivoted between upstanding ears of the guide strip. The lever 797 has its yoked portion extended and connected by adjustable springs 798 to horizontal ears 799 of the guide strip. The springs urge the roller toward the guide strip and upon the paper tape 700.

A typewriter ink-ribbon 800 is led over transversely across the middle of the guide strip 714 and over the paper tape 700; the flanges of the guide strip being broken away at the middle for its passage. The ribbon 800 is carried on two opposed similar reels 802 and 804 (Figs. 11, 12 and 17), within the annulus of the typewriter frame and slightly below and on opposite sides of the guide strip 714. The reels are journaled on pins 806 bolted to a vertical plate 808. The plate has a threaded hole near its bottom (see Fig. 17) adapted to screw onto the threaded end of a supporting tube 810, and is locked by a pin 812 spaced from the tube and extending from the typewriter frame through a hole in the plate 808. The threaded end of the pin 812 is screwed into a threaded hole provided for it in the type lever supporting ring 480. The tube 810 is projected through a radial hole in the annular sub-frame 474 and is locked therein by a round nut 809 engaging with a threaded portion of the pipe. The nut is retained between the outer vertical face of the sub-frame 474, and a spaced vertical flange 811 integral therewith. The purpose of this type of retention is to permit the tube 810 to be moved slightly in or out to adjust the ribbon position; the nut 809 being knurled to permit this adjustment by hand. When the center of the ribbon 800 becomes excessively worn, it may be moved laterally slightly to present either unused edge portion to the type.

Means are provided for longitudinally feeding the ribbon 800. Integral with the hub of each reel 802 and 804, is a gear 814 and 816 respectively. The two gears however, are spaced at different distances from the bodies of their reels, so as to be out of line with each other. The pinion 818 for selectively driving either gear, is pinned to the end of a shaft 820 journaled in the tube 810 and slidable axially therein to engage the pinion 818 with either gear. A locking pin 822 is urged against the shaft by a spring 824, both housed in a cup 826 screwed into a threaded opening in the tube wall. Two annular V-grooves in the shaft 820, cooperate with the pin 822 to tend to retain the pinion in mesh with either gear. A knurled handwheel 832 (Figs. 17 and 18) pinned to the outer end of the shaft permits it to be moved in or out, and permits its rotation, by hand.

Automatic means are provided for rotating shaft 820 to move the inking ribbon. Integral with the hand-wheel 832, is a ratchet 834. The ratchet-operating dog 836 is journaled on a pin 838 bolted to a rocking lever 840, and is urged toward the ratchet by a spring 842 extending to an arm of the lever 840. The lever 840 is pinned to a rock shaft 844 which is journaled in a bearing 846 depending from and bolted to the outside of the casting 474 by an integral plate 848. The rock shaft is driven through a crank 850 pinned to its inner end and pivoted to a connecting rod 852 bolted acentrically to the end plate 220 of the code wheel unit. Each time the code wheel unit rocks it advances the ratchet 834 and moves the inking ribbon, in one direction or the other depending on whether the pinion 818 is in mesh with gear 814 or gear 816. Retrogression of the ratchet 834 is prevented by an auxiliary dog 854 pivoted to the plate 848 and urged toward the ratchet by a spring 856 between it and the plate.

General

In attempting to decipher a code message the cryptographic expert is equipped with tables of letter frequencies so that, in viewing a message he may expect 11.4% of "E"s, 7.7% of "A"s, 5.1% of "D"s, 0.3% of "Z"s, etc., and if the message is in code and is long enough to reasonably meet these probable percentages, he will be able to set up certain "Equations of probability" toward deciphering the code. If the code is arranged in normal word length he can set up other equations of probability involving the one letter words "A", "I" and "O", the percentages of two-letter words which are "is", "to", "it", etc., the percentages of three-letter words, of four-letter words, and so on. Other possible equations of probability are also open to the expert, and, by combining them all, and by a process of trial and error he is enabled to decipher the code. These experts have become so skilled, that up to the time of the production of the Hebern coding machine, no code was considered invulnerable. Even where the code was continually changed after each letter had been coded, and throughout an entire alphabet, the experts were able to set up tables and equations of "secondaries" which could be relied upon to recur every twenty-six or other ascertainable number of times. The Hebern multiple commutator machines break up these secondaries into "tertiaries", the tertiaries again into a fourth power, and so on; until the code becomes too complex to be deciphered by any means known to cryptographic experts. By spacing the letters into blocks of five, and by using a changing code sequence to designate the spaces between words, this other clew to deciphering messages by word lengths is definitely closed to the cryptographic expert, and the machine becomes a safe vehicle for such secrecy as may be essential to the conduct of business, legal or governmental affairs of a confidential nature.

System of coding

From the standpoint of undecipherability, the ideal method of coding messages would be to select each code character or symbol at random and according to no system whatsoever, but such a code message would be undecodable as well as undecipherable, and so would be useless. The code must follow some system. It has been well known that if a coding system could be sufficiently complicated, the code produced thereby would effectively be undecipherable, but in the past such codes have not been evolved because they were, from a standpoint of practicability, undecodable. Cryptographic experts have in the past made good the boast that any message which could be decoded, could also be deciphered. The Hebern system will be seen to incorporate practically unlimited complexity to make the code undecipherable and in such a way as to not affect decodability. The very essence of cryptography is modification of existing cipher, and for this reason it is desired that modifications and slight permutations from the system herein taught be regarded as within the purview of my invention if they can be referred to as following the general outline of the Hebern system herein set forth in one of its specific forms; it being evident of course, that certain steps and features of the system of my invention might be eliminated without doing violence to all the objects of my invention.

The system of my invention will be described in steps each explained with reference either to some known system of coding, or with reference to the coding machines aforedescribed.

My system of coding is based upon relating language characters of a language alphabet to code symbols of a code alphabet so that at a given time a definite relation exists between the alphabets. Each language character is represented or designated by some code symbol a d vice versa, so that messages spelled out in language or in code may be transcribed respectively into code or language equivalent by attending to these designations. Thus we might write our language and code alphabets one above the other as follows:

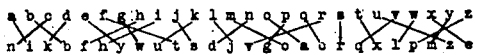

and the lines between the two alphabets may be utilized to designate the characters. They then constitute designating interconnections, and to transform any character into its code equivalent it is necessary merely to follow the designating interconnection from this character to the symbol in the code alphabet which it designates. The fact that the code symbols and language characters are both letters of the English alphabet need not affect the present discussion. They might as well be any language characters and any symbols. This first step in my system may be summarized as that of designating each language character by a code symbol so that the code alphabet is related in a certain (primary) relation to the language alphabet. A system which went no further than this first step is readily decipherable by tables of letter frequencies. (E. g. in ordinary uncoded messages we should expect to find 11.4% of "E"s, 7.7% of "A"s, 5.1% of "D"s, 0.3% of "Z"s, etc., and therefore the code character which recurs most frequently we should expect to represent "E", that which occurs about eight times per hundred letters, would most probably represent "A", and so on.)

A valuable provision of the improved system of my invention is that these designating interconnections are not limited in incidence but may be selected to connect any pairs of characters at random. This constitutes an improvement over the system followed by the earlier code machine of my invention, (described in Patent 1,510,441) in which the characters were connected invertly in pairs. Connection of the characters at random involves more than merely avoiding a reciprocal or complementary relation between the characters of the two alphabets. In this random arrangement there is no special sequential relation between the code and language alphabets. In other words a random sequence exists between the alphabets. This is a decided improvement over the Vigenere cryptographic table, in which the code and language alphabets have the same fixed sequence and merely are bodily displaced relative to one another. The importance of this feature will be appreciated more fully in view of the second step of the improved system of my invention.

The second step of my system is to continually change the relation between the two alphabets so as to change the character designations. The relation is changed according to a definite plan, and this plan involves moving, not merely one alphabet relative to the other, but simultaneously moving the designating interconnections relative to both alphabets. This changes the sequence between the alphabets. It will be observed that the plan of code-change, while dependent upon the character of movement of the designating interconnections, is also dependent upon their arrangement, so that the plan may be changed by altering the effective incidence of the interconnections or by altering the character of their movement. The random sequence existing between the alphabets makes my system as so-far described, invulnerable to the method of deciphering which is most effective against the Vigenere code; viz. of blocking the code into columns twenty-six letters wide and applying the tables of letter frequencies on diagonal lines through the column.

The features of the Hebern system so-far enumerated, are accomplished by the normal operation of the midget coder or elemental machine, aforedescribed. The electric circuits cause the language and code characters to designate one another. The sequence of designation (primary sequence) is determined by the positioning of the character-bearing lenses 10. The designations are changed, according to a definite (primary) plan (or secondary sequence), by rotating the commutator through a step after each letter is coded. The secondary sequence is controlled by the random wiring of the commutator, (see wires 40) and is therefore a random sequence. Each new commutator position presents an interconnecting commutator wire having an entirely different incidence bearing no relation to that of the wire previously presented, to each pair of designating and designated characters. In the normal operation of the midget coder there are twenty-six possible different primary relations between alphabets attainable by rotating the reversing commutator, and involving no change whatever in the key conditions such as commutator wiring.

As a further feature of the Hebern system, and in order that the number of code changes not be limited to twenty-six; the group of designating interconnections are, in effect split down the middle to subdivide each interconnection into two links. These links are relatively movable so that each half-group of designating interconnections may be moved separately instead of only bodily moving the entire group of interconnections. Thus, for each position of one half the group of connections there are twenty-six possible positions of the other half, making a total of twenty-six squared, or six hundred twenty-six possible different code changes. There are a number of different ways in which these two half-groups of interconnections might be moved, relative to one another and to the characters they interconnect; but, if decoding is to be accomplished, the movement must follow some definite plan. The Hebern system uses a plan adapted to exhaust, or at least to substantially exhaust, the potential six hundred seventy-six changes without repetition. This may be accomplished by moving either one of the half-groups of connections (or both together) through approximately twenty-six spaces relative respectively to one (or both) of the alphabets; and then advancing the other half-group one space relative to one of the alphabets, (or relative to the other half-group). The same result might be accomplished in other more complicated fashion, as for example, by moving both halves together twenty-six times, then one alone twenty-five times, and then both together again. The essential prescription is that the possible relative positions be substantially exhausted, substantially without repetitions or recurrences such as would take place where the relative movements are not planned to avoid such recurrences. In short, the half-groups are moved in progressive non-recurrent succession. One half-group is moved continually (after each letter has been coded) and the other half-group is advanced one step after each twenty-six steps of the first half, until the six hundred and seventy-six possible combinations have been exhausted. Thus, if tables of letter frequencies were to be used in deciphering code produced by this system, they could be applied only to every six hundred and seventy-sixth letter thereof, and a tremendous volume of messages would need to be acquired by the unauthorized persons, to make these tables at all applicable.

Actually, my system is not rigidly limited to the use of every last possible combination. Thus the use of only twenty-five or even twenty or less combinations out of every twenty-six possible combinations might be tolerated so long as it does not vitiate the purposes of the present invention. The important qualification of my system is that it provides a code complexity measured not by the sum, or even the multiple of the code-complicating groups provided; but increases as the exponential power of the number of such groups or code wheels. While calling for a system which does not necessarily exploit every last potential positional combination, it is essential to emphasize that any plan (or lack of plan) which permits recurrences of code every fractional portion of the potential maximum is foreign to the spirit of my invention. This will be more clearly appreciated when it is understood, that in final form my invention contemplates a system in which the (said) group of interconnections is split, not in halves, but into three, four, five, or more parts, each of which is capable of movement, and each of which is moved at progressively longer intervals in "non-recurrent" fashion. Whereas the interconnections were capable of twenty-six squared ($26^2$) potentially different changes, when split in half; they are capable of twenty-six cubed ($26^3$) changes when divided into three parts; and so on to a number of changes equal to the number of letters in the alphabet raised to the power of the number of parts into which the connections have been split. But in order to realize the advantages of such subdivision it is essential that frequent recurrences and repetitions be avoided. My plan makes possible a limitless number of changes, although I have found that in practice it is never necessary to use more than five subdivisions, giving $26^5$ potential changes.

Recurrences of code sequence in and of themselves are not essentially a weakness, providing that the recurrences have no particular or discoverable sequence in the cryptogram. Recurrences are possible with the Hebern system unless the interconnections are especially calculated to avoid them; but since these interconnections are purely random ones, they set up no particular sequence of recurrences. In fact if the Hebern system were carried far enough there would unavoidably be recurrences since there are only about $4.07 \times 10^{26}$ possible different sequences and displacements of twenty-six letters. (This may be calculated by the equation $x_n = x_{n-1} \times (n-1)$; where $x_n$ is the number of different arrangements, for an alphabet of $n$ letters; and where, when $n=1$, $x=1$.) Even if these $4.07 \times 10^{26}$ changes were exhausted there still would be no law of their recurrence in the Hebern system, and therefore no key to deciphering the code could be applied.

The mechanistic features of the Hebern system have been explained on the basis of split groups of designating interconnections. This expedient of splitting groups of interconnections is a valuable feature of the Hebern system, but, in broadest terms the system transcends any such expedient, and constitutes a plan of selection of symbols for coding messages. The plan is: to relate a code alphabet in some sequential relation to a language alphabet, and to change this relation and sequence, (preferably after each letter has been coded) according to a definite (primary) plan, or secondary sequence, which in turn is changed (preferably after twenty-six letters have been coded), according to a definite (secondary) plan, or tertiary sequence, and so on to a hierarchy of plans or sequences, each of which comes into action when, and not until, the one below it is nearly exhausted.

This system is exemplified by the portable multi-coders of my invention, where each language character on the operating push-button keyboard would, at any instant, be designated by some code character on the indicating light board; it being necessary merely to depress the operating lever 262, and then to press each push button successively without releasing the lever 262, to discover the relative sequence between the code and language alphabets at that time. This relative sequence is altered, each time code wheel $82_1$ (which has been arbitrarily assumed as the constantly-rotating wheel) is advanced, according to the (secondary) sequence determined by the wiring of this code-wheel commutator $82_1$. But after code wheel $82_1$ has advanced twenty-six spaces, the (secondary) sequence determined by it, is changed, by the advancement of code wheel $82_2$, according to the (tertiary) sequence determined by the wiring of this code wheel $82_2$; and so on to a fourth, fifth, and sixth sequence, each of which is determined by the wiring of one of the (differently wired) code wheel commutators. And it will be noted that the sequences are changed in progressive succession lacking any fixed order of recurrence, as the code wheels are moved in progressive non-recurrent succession, so that each higher sequence affects the sequence subordinate to it when, and not until the subordinate sequence is nearly exhausted. Each of these sequences or plans of change of code is determined both by the wiring and movement of the code wheels, and since each code wheel is differently wired and is moved at a different periodicity or speed, each of these sequences or plans is different. The relative speeds determine the order of sequence or plan as between subordinate and higher arrangement in the hierarchy of plans, while the wiring of the code wheels determines the particular random plan for any given order of speed arrangement. In order to interchange these sequences or plans as between higher and subordinate nature it is necessary merely to interchange the dogging pins 286 to cause any one of the five code wheels to be the constantly rotated one, and to cause the other wheels to rotate respectively after each twenty-sixth, six-hundred seventy-sixth, seventeen thousand five hundred seventy-sixth, etc., letter has been coded. Or by adding or removing dogging pins, less than all the sequences may be employed, or the coding system may be changed. The effect upon the system, of shifting any of the commutator wires to different terminals, is to replace the random sequence determined by the commutator affected, to some other random sequence of the same order. Thus, for example, altering the wiring of code wheel $82_1$ without affecting its character of advancement from the case discussed above, would alter the secondary sequence determined thereby to a different secondary sequence; and since the primary sequence is subordinate to the secondary sequence, it too, obviously, would be altered.

The effect of transposing the code wheels by inverting any of them or by interchanging them in position, is to alter the relation between the movable links and the fixed links of the designating interconnections, and thereby in effect, to change the basic plan of code-change to another basic plan of the same order.

The effect of setting the code wheels by hand to different starting positions is to alter their phase relation independently of the driving mechanism, and thereby to alter the starting point of the cycle of the 11,881,376 code changes.

The auto-multi-coder automatically follows this system exemplified by the portable multi-coder, with the following feature of refinement:

In addition to designating the language characters by code symbols, the auto-multi-coder provides for designating the spaces between words, by code symbols subject to the same code-complicating features as the other symbols. In fact, for simplicity, one of the language characters is arbitrarily used to designate word-spaces, and it, in turn, is designated by code symbols. Thus the grouping of the symbols in a message coded to my improved system, cannot form a clue to deciphering the code.

In the Hebern system, the rules of change of code are purely mechanical ones bearing no relation whatever to the particular language letters or the order in which they may be arranged in a message. Decoding may be readily accomplished according to these mechanical rules, whereas known systems of deciphering cannot be applied to non-recurrent code solely according to such complicating mechanical rules without regard to the (probable) original letters and their (probable) arrangement in the message which the cryptographic expert attempts to reconstruct from the given jumble of code symbols. Thus I have accomplished by object of providing a cryptographic system for constructing undecipherable code messages which may readily be decoded.

While the most stress has been laid upon tables of letter frequencies in this explanation, it is recognized that this is but one of the devices open to cryptographic experts in deciphering codes. The device is fairly representative however, and suffices to exemplify the manner in which sufficient complication of a code can make the usual methods of attack ineffective. By utilizing a hierarchy of sequences, the Hebern system makes any known deciphering device too indirect to be of any value. And there is no limit to the amount of complication, obtainable by carrying the hierarchy of sequences into higher and higher powers.

I claim:

1. In a cryptographic machine comprising a plurality of language and code symbols, and like designating-interconnections between said symbols; said interconnections being all similarly divided up to provide a series of relatively movable portions with corresponding said portions arranged in groups, a movable support for each of said groups, driving means adapted to move each support, and selective means for preventing normal movement of less than all of said supports whereby the number of driven supports may be varied at will.

2. In a cryptographic machine comprising a plurality of language and code symbols, and like designating-interconnections between said symbols; said interconnections being all similarly divided up to provide a series of relatively movable portions with corresponding said portions arranged in groups, a movable support for each of said groups, driving means adapted to move each support, and selective means for preventing normal movement of any said support whereby the number and selection of driven supports may be varied at will.

3. In a cryptographic machine comprising a plurality of language and code symbols, and like designating-interconnections between said symbols; said interconnections being all similarly divided up to provide a series of relatively movable portions with corresponding said portions arranged in groups, a movable support for each of said groups, driving means adapted to move each support, and selective means for preventing normal movement of any one or more supports whereby any particular support or supports may be driven, as desired.

4. In a cryptographic machine comprising a plurality of language and code symbols, and like designating-interconnections between said symbols; said interconnections being all similarly divided up to provide a series of relatively movable portions with corresponding said portions arranged in groups, a movable support for each of said groups, driving means for moving said supports at definite relative speeds, and selective means for varying the relative speed of any one or more supports.

5. In a crytographic machine comprising a plurality of language and code symbols, and like designating-interconnection between said symbols; said interconnections being all similarly divided up to provide a series of relatively movable portions with corresponding said portions arranged in groups, a movable support for each of said groups, driving means for moving said supports at definite relative speeds, and selective means for varying the relative speed of any one or more supports from zero to maximum speed.

6. In a crytographic machine comprising a plurality of language and code symbols, and like designating-interconnections between said symbols; said interconnections being all similarly divided up to provide a series of relatively movable portions with corresponding said portions arranged in groups, a movable support for each of said groups; said supports being transposable; driving means adapted to move each support, and selective means for altering the normal movement of less than all said supports.

7. In a crytographic machine comprising a plurality of language and code symbols, and like designating-interconnections between said symbols, said interconnections being all similarly divided up to provide a series of relatively movable portions with corresponding said portions arranged in groups, a movable support for each of said groups; driving means for moving said supports at definite relative speeds; said driving means being adapted to permit independent movement of a support to adjust the phase relation between supports; and selective means for altering the normal movement of less than all said supports.

8. In a cryptographic machine comprising a plurality of language and code symbols, and like designating-interconnections between said symbols; said interconnections being all similarly divided up to provide a series of relatively movable portions with corresponding said portions arranged in groups, a movable support for each of said groups; driving means for moving said supports at definite relative speeds; said supports being transposable, and said driving means being adapted to permit independent movement of a support to adjust the phase relation between supports; and selective means for altering the normal movement of less than all said supports.

9. In a crytographic machine, a plurality of code-changing code wheels, means for revolving one of said code wheels, cam means adapted to revolve with said one code wheel, means controlled by said cam for revolving a second code wheel in determined relation to said one code wheel, cam means adapted to revolve with said second code wheel, means controlled by said last cam for revolving a third code wheel in determined relation to said second code wheel, and so on, for as many code wheels as may be provided.

10. The structure as in claim 9, in which the cam means are constituted by cam profiles formed on the code wheels.

11. The structure as in claim 9, in which the cam means are constituted by cam profiles formed on the code wheels, and in which the code wheels are transposable.

12. The structure as in claim 9, in which the cam means are constituted by cam profiles formed on the code wheels, and in which the code wheels are independently movable whereby their phase relation may be adjusted.

13. In a cryptographic machine, a plurality of code-changing code wheels means for revolving one of said code wheels, cam means adapted to revolve with said one code wheel, ratchet means for revolving a second code wheel, means controlled by said cam for rendering said ratchet means inoperative at certain times, cam means adapted to revolve with said second code wheel, ratchet means for revolving a third code wheel, and means controlled by said last-included cam for rendering said last-included ratchet means inoperative at certain times, and so on, for as many code wheels as may be provided.

14. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times.

15. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; said controlling means being adjustable to alter the operative connections between said ratchet and cam means.

16. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; said controlling means being adjustable to operatively connect different cam and ratchet means selectively.

17. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; said controlling means being adjustable to operatively connect a given ratchet means selectively to one or more cam means.

18. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; said controlling means being adjustable to operatively connect a given cam means selectively to one or more ratchet means.

19. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; said controlling means being adjustable to operatively connect any given ratchet means selectively to one or more cam means.

20. In a cryptoghaphic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; said controlling means being adjustable to operatively connect any given cam means to one or more ratchet means.

21. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; said controlling means being adjustable to operatively connect a given ratchet means selectively to any one or more cam means.

22. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; said controlling means being adjustable to operatively connect a given cam means selectively to any one or more ratchet means.

23. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; and adjusting means for selectively disconnecting said controlling means from any cam means.

24. In a cryptographic machine, a plurality of code-changing code wheels, ratchet means for revolving each code wheel, cam means adapted to revolve with each code wheel, and controlling means adapted to operatively connect said cam and ratchet means for rendering certain ratchet means inoperative at certain times; and adjusting means for selectively disconnecting said controlling means from any ratchet means.

25. In a cryptographic machine, a plurality of code-changing code wheels having ratchet teeth and cam profiles formed thereon, ratchet dogs cooperating with said teeth to rotate said wheels, cam followers, and controlling means operatively connecting said dogs to said followers for incapacitating certain ratchet dogs at certain times.

26. In a cryptographic machine, a plurality of invertible code-changing code wheels having ratchet teeth and cam profiles formed thereon, ratchet dogs cooperating with said teeth to rotate said wheels, cam followers, and controlling means operatively connecting said dogs to said followers for incapacitating certain ratchet dogs at certain times.

27. In a cryptographic machine, a plurality of interchangeable code-changing code wheels having ratchet teeth and cam profiles formed thereon, ratchet dogs cooperating with said teeth to rotate said wheels, cam followers, and controlling means operatively connecting said dogs to said followers for incapacitating certain ratchet dogs at certain times.

28. In a cryptographic machine, a plurality of code-changing code wheels having ratchet teeth and cam profiles formed thereon, ratchet dogs cooperating with said teeth to rotate said wheels, cam followers, and controlling means operatively connecting said dogs to said followers for incapacitating certain ratchet dogs at certain times; said controlling means being adjustable to selectively shift control of different dogs to or from any follower.

29. In a cryptographic machine, a plurality of code-changing code wheels having ratchet teeth and cam profiles associated therewith, a plurality of ratchet dogs and cam follower dogs in operable combination with said ratchet teeth and cam profiles, linkage adjacent said dogs, and elements adapted to connect said linkage to both ratchet and follower dogs whereby movement of the cam follower dogs controls the ratchet dogs.

30. In a cryptographic machine, a plurality of code-changing code wheels having ratchet teeth and cam profiles associated therewith, a plurality of ratchet dogs and cam follower dogs in operable combination with said ratchet teeth and cam profiles, linkage adjacent said dogs, and elements adapted to connect said linkage to both ratchet and follower dogs whereby movement of the cam follower dogs controls the ratchet dogs, said elements being shiftable to connect different dogs.

31. In a cryptographic machine, a plurality of code-changing code wheels, means for effecting rotative displacements of all of said code wheels simultaneously, and ratchet means adapted to hold certain code wheels immovable at certain times to cause relative rotation of the code wheels.

32. In a cryptographic machine, a plurality of code-changing code wheels, power-driven means for effecting rotative displacements of all of said code wheels simultaneously, and ratchet means adapted to hold certain code wheels immovable at certain times to cause relative rotation of the code wheels.

33. In a cryptographic machine, a plurality of code-changing code wheels, means including a battery of electro-magnets for effecting rotative displacements of all of said code wheels simultaneously, and ratchet means adapted to hold certain code wheels immovable at certain times to cause relative rotation of the code wheels.

34. In a cryptographic machine, a plurality of code-changing code wheels, means including a coplanar battery of electro-magnets for effecting rotative displacements of all of said code wheels simultaneously, and ratchet means adapted to hold certain code wheels immovable at certain times to cause relative rotation of the code wheels.

35. In a cryptographic machine comprising a plurality of language and code symbols and like designating interconnections between said symbols; said interconnections being all similarly divided up to provide a series of relatively movable portions with corresponding said portions arranged in groups, a common and movable support for said groups, and power-driven means for moving said support.

36. In a cryptographic machine, a plurality of electric circuits, character-designating electro-responsive devices and controlling switches therefor operatively connected in said circuits, a plurality of finger-keys for actuating said switches, code-changing commutators interposed in at least some of said circuits, an electro-magnetic power unit connected in circuit with said commutators, and means actuated by said power unit for moving said commutators, whereby change of code is automatically accomplished.

37. As a subcombination, an electric keyboard comprising a plurality of keys, individual switches actuable by said keys, a master switch actuable by any of said keys, and adjusting means for varying the relation of the switches whereby the master switch and an individual switch may be actuated in proper sequence by said keys.

38. A cryptographic devise comprising a plurality of language and code characters, a directly-conditioned and an alternative inversely-conditioned set of transitory designating interconnections between said characters; said interconnections being each composed of a series of relatively movable portions arranged in groups of one portion from each interconnection; a support for each of said groups, and means for moving one of said supports to complete either alternative set of interconnections, whereby messages which are coded through one set of interconnections are decodable through the other set; said one group being movable to shift any given portion to any interconnection of its set, whereby said interconnections are sur-transposable to different characters.

39. A cryptographic device comprising a plurality of language and code characters, a directly-conditioned and an alternative inversely-conditioned set of transitory designating interconnections between said characters; said interconnections being each composed of a series of relatively movable portions arranged in groups of one portion from each interconnection; a support for each of said groups, and means for moving one of said supports to complete either alternative set of interconnections, whereby messages which are coded through one set of interconnections are decodable through the other set; said one group being movable to shift any given portion to any interconnection of its set, whereby said interconnections are sur-transposable to different characters; driving means adapted to move others of said supports; and selective means for altering the normal movement of less than all said last-included supports.

40. A cryptographic device comprising a plurality of language and code characters, a directly-conditioned and an alternative inversely-conditioned set of transitory designating interconnections between said characters; said interconnections being each composed of a series of relatively movable portions arranged in groups of one portion from each interconnection; a support for each of said groups, and means for moving one of said supports to complete either alternative set of interconnections, whereby messages which are coded through one set of interconnections are decodable through the other set; said one group being movable to shift any given portion to any interconnection of its set, whereby said interconnections are sur-transposable to different characters; driving means adapted to move others of said supports; said last-included supports being transposable.

41. A cryptographic device comprising a plurality of language and code characters, a directly-conditioned and an alternative inversely-conditioned set of transitory designating interconnections between said characters; said interconnections being each composed of a series of relatively movable portions arranged in groups of one portion from each interconnection; a support for each of said groups, and means for moving one of said supports to complete either alternative set of interconnections, whereby messages which are coded through one set of interconnections are decodable through the other set; said one group being movable to shift any given portion to any interconnection of its set, whereby said interconnections are sur-transposable to different characters; driving means adapted to move others of said supports; said last-included supports being transposable; and selective means for altering the normal movement of less than all said last-included supports.

42. A cryptographic device comprising a plurality of language and code characters, a directly-conditioned and an alternative inversely-conditioned set of transitory designating interconnections between said characters; said interconnections being each composed of a series of relatively movable portions arranged in groups of one portion from each interconnection; a support for each of said groups, and means for moving one of said supports to complete either alternative set of interconnections, whereby messages which are coded through one set of interconnections are decodable through the other set;

said one group being movable to shift any given portion to any interconnection of its set, whereby said interconnections are surtransposable to different characters; driving means adapted to move others of said supports; said driving means being adapted to permit independent movement of a support to adjust the phase relation between supports.

43. A cryptographic device comprising a plurality of language and code characters, a directly-conditioned and an alternative inversely-conditioned set of transitory designating interconnections between said characters; said interconnections being each composed of a series of relatively movable portions arranged in groups of one portion from each interconnection; a support for each of said groups, and means for moving one of said supports to complete either alternative set of interconnections, whereby messages which are coded through one set of interconnections are decodable through the other set; said one group being movable to shift any given portion to any interconnection of its set, whereby said interconnections are surtransposable to different characters; driving means adapted to move others of said supports; said last-included supports being transposable, and said driving means being adapted to permit independent movement of a support to adjust the phase relation between supports; and selective means for altering the movement of less than all said last-included supports.

44. A cryptographic machine comprising a plurality of language and code characters; a directly-conditioned set of electrical circuits constituting designating interconnections between said characters; an alternative inversely-conditioned set of electrical circuits constituting oppositely designating interconnections between said characters; a commutator incorporating a plurality of sub-circuits, and commutator brushes, for connecting all the separate circuits of either said set through the commutator simultaneously; said commutator being rotatable to alternatively complete either said set of circuits whereby messages which are coded through one set of circuits are decodable through the other set.

45. A cryptographic machine comprising a plurality of language and code characters; a directly-conditioned set of electrical circuits constituting designating interconnections between said characters; an alternative inversely-conditioned set of electrical circuits constituting oppositely designating interconnections between said characters; a commutator incorporating a plurality of sub-circuits, and commutator brushes, for connecting all the separate circuits of either said set through the commutator simultaneously; said commutator being rotatable to alternatively complete either said set of circuits whereby messages which are coded through one set of circuits are decodable through the other set; said commutator brushes being perimetrically arranged, and said commutator being rotatable beyond the inverting range to connect any given circuit of a set through any of the different commutator sub-circuits, whereby said designating interconnections are shiftable to different characters.

46. In combination with a coding and decoding machine including a typewriter-like keyboard, a typewriter-like spacer-bar, and a plurality of code-symbol selectors, means for connecting said spacer-bar to a code-symbol selector whereby an actuation of the spacer bar is arranged to produce a complete and corresponding effect to that produced by the actuation of other of said selectors.

47. In combination with a coding and decoding machine including a type-writer-like keyboard, a typewriter-like spacer-bar, and a plurality of code-symbol selectors, and adjustable means for connecting said spacer-bar to any one of a plurality of said code symbol selectors.

48. As an attachment for a decoding machine including a plurality of means for designating different code characters, means adapted to incapacitate a character designator corresponding to a word space in the original message; said means being arranged to be applied to any one of a plurality of designators whereby different code characters may be originally utilized to represent word spaces in producing the coded message.

49. In a cryptographic machine involving similar electric typewriter mechanisms for recording both language and code messages, a common source of energy for said mechanisms, and means equalizing the operating force of the different said typewriter mechanisms as derived from said source of energy.

50. In combination with a recording code machine having means for recording both language and code messages on a record tape, means for splitting said tape into its language and code components.

51. In combination with a recording code machine having means for recording both language and code messages on a record tape, a pair of complementary stepped rollers on opposite sides of said tape, means for urging said rollers into shearing relation upon said tape, and means for feeding said tape centrally through said rollers to split said tape into its language and code component messages.

52. As a subcombination of the structure claimed in claim 50, a shears comprising a pair of complementary stepped rollers pressed against each other.

53. In a cryptographic machine, a plurality of code-changing code wheels, means for revolving one of said wheels, cam means adapted to revolve with said first wheel, and means controlled by said cam means operative against a second said wheel to revolve the same in determined relation to said first wheel.

54. In a cryptographic machine, a pair of code-changing code wheels having ratchet gears and cam profiles operatively associated therewith, ratchet dogs operative against said ratchet gears to rotate the same, a cam follower in operable engagement with the cam profile of one of said wheels, and means operatively connecting the dog of the other said wheel with said follower whereby the disposal of said follower controls the operative relation of said last dog to its ratchet gear.

55. In a cryptographic machine, a rotatable code-wheel, a cam associated with said wheel for operation therewith, a second code-wheel, a ratchet gear associated with said second wheel for rotating the same, a ratchet dog for operating said ratchet gear and arranged for disposal in either operative or inoperative relation to the gear, a cam follower in operable association with said cam, and means operatively connecting said dog with said follower whereby to control the said disposal of the dog relative to said gear.

56. In a cryptographic machine, a plurality of code-changing code wheels, electromagnetically operated means for oscillating all of said code wheels simultaneously, and ratchet means adapted to hold certain code wheels immovable at certain times to cause relative advancement of the code wheels.

57. In a cryptographic machine, rotatable code wheels, means for oscillating all of said code wheels simultaneously and eccentrically of their axes, and means operative to hold certain code wheels against rotation during said oscillation thereof to cause the relative advancement of a code wheel.

58. In a cryptographic machine, a plurality of code and language characters; plural means, responsive to electric circuits, for designating said characters; plural means designated by said characters for opening and closing electric circuits; a set of commutator brushes electrically connected to the first-included said means; a set of commutator brushes electrically connected to the second-included said means; a commutator having one set of "forward" contacts for said first brush set, a second set of "forward" contacts for said second brush set, and third and fourth sets of "reverse" contacts mutually alternative to the contacts of the aforesaid contact sets; conductors for connecting any given "forward" contact of one set thereof to a "forward" contact of the other set thereof and for connecting any given "reverse" contact of one set thereof to a "reverse" contact of the other set thereof; said commutator being disposable to alternately position the "forward" and "reverse" contacts thereof in registration with the different sets of brushes, whereby the circuits may be reversed to and from coding and decoding operation of the cryptographic machine.

59. In a cryptographic machine, a plurality of code and language characters; plural means, responsive to electric circuits, for designating said characters; plural means designated by said characters for opening and closing electric circuits; a set of commutator brushes electrically connected to the first-included said means; a set of commutator brushes electrically connected to the second-included said means; a commutator having one set of "forward" contacts for said first brush set, a second set of "forward" contacts for said second brush set, and third and fourth sets of "reverse" contacts mutually alternative to the contacts of the aforesaid contact sets; a set of wires connecting the "forward" contacts of the first contact set to contacts of the third contact set; a set of wires connecting each "reverse" contact of the fourth contact set to its alternative "forward" contact of the second contact set; wires connecting each wire of the first set to a wire of the second set thereof; said commutator being disposable to alternatively position the "forward" and "reverse" contacts thereof in registration with the different sets of brushes, whereby the circuits may be reversed to change to and from coding and decoding operation of the cryptographic machine.

60. In a cryptographic machine, a plurality of code and language characters; plural means, responsive to electric circuits, for designating said characters; plural means designated by said characters for opening and closing electric circuits; a set of commutator brushes electrically connected to the first-included said means; a set of commutator brushes electrically connected to the second-included said means; a commutator having one set of "forward" contacts for said first brush set, a second set of "forward" contacts for said second brush set, and third and fourth sets of "reverse" contacts mutually alternative to the contacts of the aforesaid contact sets; a set of wires connecting the "forward" contacts of the first contact set to contacts of the third contact set; a set of wires connecting each "reverse" contact of the fourth contact set to its alternative "forward" contact of the second contact set; wires connecting each wire of the first set to a wire of the second set thereof; said commutator being disposable to alternatively position the "forward" and "reverse" contacts thereof in registration with the different sets of brushes for reversing the circuits to change to and from coding and decoding operation of the cryptographic machine, or to shift each set of contacts to a new position relative to their brushes for changing the circuits without reversing them.

61. In a cryptographic machine arranged to produce and print coded and decoded messages with a plurality of symbols, means automatically operative for printing different of said symbols in successive word spaces of a code message whereby they appear as characters of the code message, and means automatically operative to reconvert said space filling symbols of the coded message into spaces in a printed decoded message produced by the machine.

In testimony whereof, I affix my signature.

EDWARD H. HEBERN.